(12) United States Patent
Singaraju et al.

(10) Patent No.: US 10,824,962 B2
(45) Date of Patent: Nov. 3, 2020

(54) UTTERANCE QUALITY ESTIMATION

(71) Applicant: Oracle International Corporation, Redwood Shores, CA (US)

(72) Inventors: Gautam Singaraju, Dublin, CA (US); Jiarui Ding, Foster City, CA (US); Vishal Vishnoi, Redwood City, CA (US); Mark Joseph Sugg, River Forest, IL (US); Edward E. Wong, Upland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 154 days.

(21) Appl. No.: 16/147,266

(22) Filed: Sep. 28, 2018

(65) Prior Publication Data

US 2019/0103095 A1 Apr. 4, 2019

Related U.S. Application Data

(60) Provisional application No. 62/566,219, filed on Sep. 29, 2017.

(51) Int. Cl.
*G06N 20/10* (2019.01)
*G06N 20/00* (2019.01)
(Continued)

(52) U.S. Cl.
CPC ......... *G06N 20/00* (2019.01); *G06F 16/2246* (2019.01); *G06F 16/285* (2019.01);
(Continued)

(58) Field of Classification Search
CPC .............................. G06N 20/00; G06N 20/10
(Continued)

(56) References Cited

U.S. PATENT DOCUMENTS 10,423,709 B1 * 9/2019 Bradley .................. G06F 40/16
10,510,336 B2 * 12/2019 Amid ...................... G06F 16/35
(Continued)

OTHER PUBLICATIONS

Chen, "Hierarchical SVM", Available on internet at: http://www.csr.utexas.edu/hyperspectral/oldwebsite/yangchi/HSVM.htm, accessed from the internet on Jul. 3, 2018, 1 page.
(Continued)

*Primary Examiner* — Susan I McFadden
(74) *Attorney, Agent, or Firm* — Kilpatrick Townsend & Stockton LLP

(57) ABSTRACT

Techniques for improving quality of classification models for differentiating different user intents by improving the quality of training samples used to train the classification models are described. Pairs of user intents that are difficult to differentiate by classification models trained using the given training samples are identified based upon distinguishability scores (e.g., F-scores). For each of the identified pairs of intents, pairs of training samples each including a training sample associated with a first intent and a training sample associated with a second intent in the pair of intents are ranked based upon a similarity score between the two training samples in each pair of training samples. The identified pairs of intents and the pairs of training samples having the highest similarity scores may be presented to users through a user interface, along with user-selectable options or suggestions for improving the training samples.

21 Claims, 13 Drawing Sheets

(51) Int. Cl.
  *G06F 16/28*     (2019.01)
  *G06F 16/22*     (2019.01)
  *H04L 12/58*     (2006.01)
  *G06N 5/00*      (2006.01)
  *G06F 16/9032*   (2019.01)
  *G06F 40/35*     (2020.01)
  *G06N 3/08*      (2006.01)
  *G10L 15/06*     (2013.01)
  *G10L 15/18*     (2013.01)
  *G06F 16/31*     (2019.01)
  *G06F 16/35*     (2019.01)
  *G06F 16/33*     (2019.01)
  *G06K 9/62*      (2006.01)
  *G10L 15/16*     (2006.01)

(52) U.S. Cl.
  CPC ........ *G06F 16/322* (2019.01); *G06F 16/3331* (2019.01); *G06F 16/35* (2019.01); *G06F 16/90332* (2019.01); *G06F 40/35* (2020.01); *G06K 9/627* (2013.01); *G06K 9/6227* (2013.01); *G06N 3/08* (2013.01); *G06N 5/003* (2013.01); *G06N 20/10* (2019.01); *G10L 15/063* (2013.01); *G10L 15/1815* (2013.01); *H04L 51/02* (2013.01); *H04L 51/04* (2013.01); *G10L 15/16* (2013.01); *G10L 2015/0638* (2013.01)

(58) Field of Classification Search
  USPC ......................................................... 704/243
  See application file for complete search history.

(56) References Cited

U.S. PATENT DOCUMENTS

| | | | |
|---|---|---|---|
| 10,553,202 B2* | 2/2020 | Amid | G10L 15/1815 |
| 10,599,885 B2* | 3/2020 | Galitsky | G06F 40/205 |
| 2018/0365228 A1* | 12/2018 | Galitsky | G06F 40/30 |

OTHER PUBLICATIONS

Chen et al., "Integrating Support Vector Machines in a Hierarchical Output Space Decomposition Framework", IEEE, vol. 2, Sep. 2004, pp. 949-952.
Marchick, "VoiceLabs Path Explorer for Amazon Alexa and Google Assistant Analytics" http://voicelabs.co/2017/03/23/voicelabs-path-explorer-dive-deeper-in-voice-pathing-for-amazon-alexa-and-google-assistant-analytics/, Mar. 23, 2017, accessed from the internet on Oct. 23, 2018, 6 pages.
U.S. Appl. No. 16/147,270, Application as filed on Sep. 28, 2018, 87 pages.
U.S. Appl. No. 16/147,273, Application as filed on Sep. 28, 2018, 90 pages.
U.S. Appl. No. 16/147,249, Application as filed on Sep. 28, 2018, 139 pages.
Oracle Intelligent Bots, Oracle Mobile Cloud Enterprise—Data Sheet, Integrated Cloud Application & Platform Service, Copyright Sep. 2017, 5 pages.
Building Intelligent Chatbots, Oracle Developers, https://developer.oracle.com/chatbots, accessed from the internet on Oct. 31, 2018, 5 pages.
Uliyar, A Primer: Oracle Intelligent Bots, Powered by artificial intelligent, White Paper, Sep. 2017, 28 pages.

* cited by examiner

UTTERANCE QUALITY ESTIMATION

CROSS-REFERENCE TO RELATED APPLICATIONS

The present application claims the benefit of and priority to U.S. Provisional Patent Application No. 62/566,219, filed on Sep. 29, 2017, entitled "Techniques For Improving A Bot System," the entire content of which is herein incorporated by reference for all purposes.

BACKGROUND

Many users around the world are on instant messaging or chat apps in order to get instant reaction. Organizations often use instant messaging or chat platforms to engage with customers or end users intelligently and contextually in live conversation. However, it can be very costly for organizations to employ service people to engage in live communication with customers or end users. Chatbots or bots have begun to be designed to simulate conversations with human users, especially over the Internet. End users can communicate with bots through many messaging apps that the end users have already installed and used, without the need to individually download and install new apps. An intelligent bot, generally powered by artificial intelligence (AI), can improve the conversational experience, allowing a more natural conversation between the bot and the end user. Instead of the end user learning a fixed set of keywords or commands that the bot knows how to respond to, an intelligent bot may be able to understand the end user's intention based upon user utterances in natural language and respond accordingly. In many cases, determining the end user's intents in order to respond properly is a challenging task in part due to the subtleties and ambiguity of natural languages.

SUMMARY

Techniques disclosed herein relate generally to improving quality of classification models, and more particularly, to improving quality of classification models for differentiating different user intents by improving the quality of training samples used to train the classification models. According to certain embodiments, pairs of intents that are difficult to differentiate by classification models trained using the given training samples (e.g., user utterances) may be identified based upon distinguishability scores (e.g., F-scores). For each of the identified pairs of intents, pairs of training samples each including a training sample associated with one intent and a training sample associated with the other intent in the pair of intents are ranked based upon a similarity score between the two training samples in each pair of training samples. The identified pairs of intents and the pairs of training samples having the highest similarity scores may be presented to users through a user interface, along with user-selectable options or suggestions for improving the training samples. The user-selectable options may include adding, deleting, or modifying some training samples, or adding, deleting, or modifying some intents. Various inventive embodiments are described herein, including methods, systems, non-transitory computer-readable storage media storing programs, code, or instructions executable by one or more processors, and the like.

In certain embodiments, a method of improving training samples for training an intent classification model to classify end user utterances into a plurality of intents is disclosed. The method may include selecting, by a computing system from the plurality of intents, a first pair of intents including a first intent and a second intent, where a first subset of the training samples is associated with the first intent and a second subset of the training samples is associated with the second intent. The method may also include training, based upon the first subset of the training samples and the second subset of the training samples, a classification model for classifying end user utterances associated with the first pair of intents. The method may further include determining a distinguishability score for the first pair of intents, where the distinguishability score may indicate classification quality of the trained classification model. The method may include determining that the distinguishability score for the first pair of intents is below a threshold value, determining a similarity score for each respective pair of training samples in pairs of training samples that each include one training sample from the first subset of the training samples and one training sample from the second subset of the training samples, and selecting a pair of training samples that has a highest similarity score among the pairs of training samples. The method may further include providing, through a user interface, information regarding the first pair of intents, the selected pair of training samples, and a user-selectable option for improving the training samples.

In certain embodiments, a non-transitory computer readable medium may store a plurality of instructions executable by one or more processors. The plurality of instructions, when executed by the one or more processors, may cause the one or more processors to: select, from a plurality of intents, a first pair of intents including a first intent and a second intent, where a first subset of training samples is associated with the first intent and a second subset of training samples is associated with the second intent; train a classification model for classifying end user utterances associated with the first pair of intents based upon the first subset of training samples and the second subset of training samples; and determine a distinguishability score for the first pair of intents, the distinguishability score indicating classification quality of the trained classification model. The plurality of instructions may also cause the one or more processors to determine that the distinguishability score for the first pair of intents is below a threshold value, determine a similarity score for each respective pair of training samples in pairs of training samples that each include one training sample from the first subset of training samples and one training sample from the second subset of training samples, and select a pair of training samples that has a highest similarity score among the pairs of training samples. The plurality of instructions may further cause the one or more processors to provide, through a user interface, information regarding the first pair of intents, the selected pair of training samples, and a user-selectable option for improving the training samples.

In certain embodiments, a system may include one or more processors and a memory coupled to the one or more processors and storing instructions. The instructions, when executed by the one or more processors, may cause the one or more processors to: select, from a plurality of intents, a first pair of intents including a first intent and a second intent, where a first subset of training samples is associated with the first intent and a second subset of training samples is associated with the second intent; train a classification model for classifying end user utterances associated with the first pair of intents based upon the first subset of training samples and the second subset of training samples; and determine a distinguishability score for the first pair of intents, the distinguishability score indicating classification quality of the trained classification model. The instructions may also cause the one or more processors to determine that the distinguishability score for the first pair of intents is below a threshold value, determine a similarity score for each respective pair of training samples in pairs of training samples that each include one training sample from the first subset of training samples and one training sample from the second subset of training samples, and select a pair of training samples that has a highest similarity score among the pairs of training samples. The instructions may further cause the one or more processors to provide, through a user interface, information regarding the first pair of intents, the selected pair of training samples, and a user-selectable option for improving the training samples.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Illustrative examples are described in detail below with reference to the following figures.

DETAILED DESCRIPTION

Figure 1:
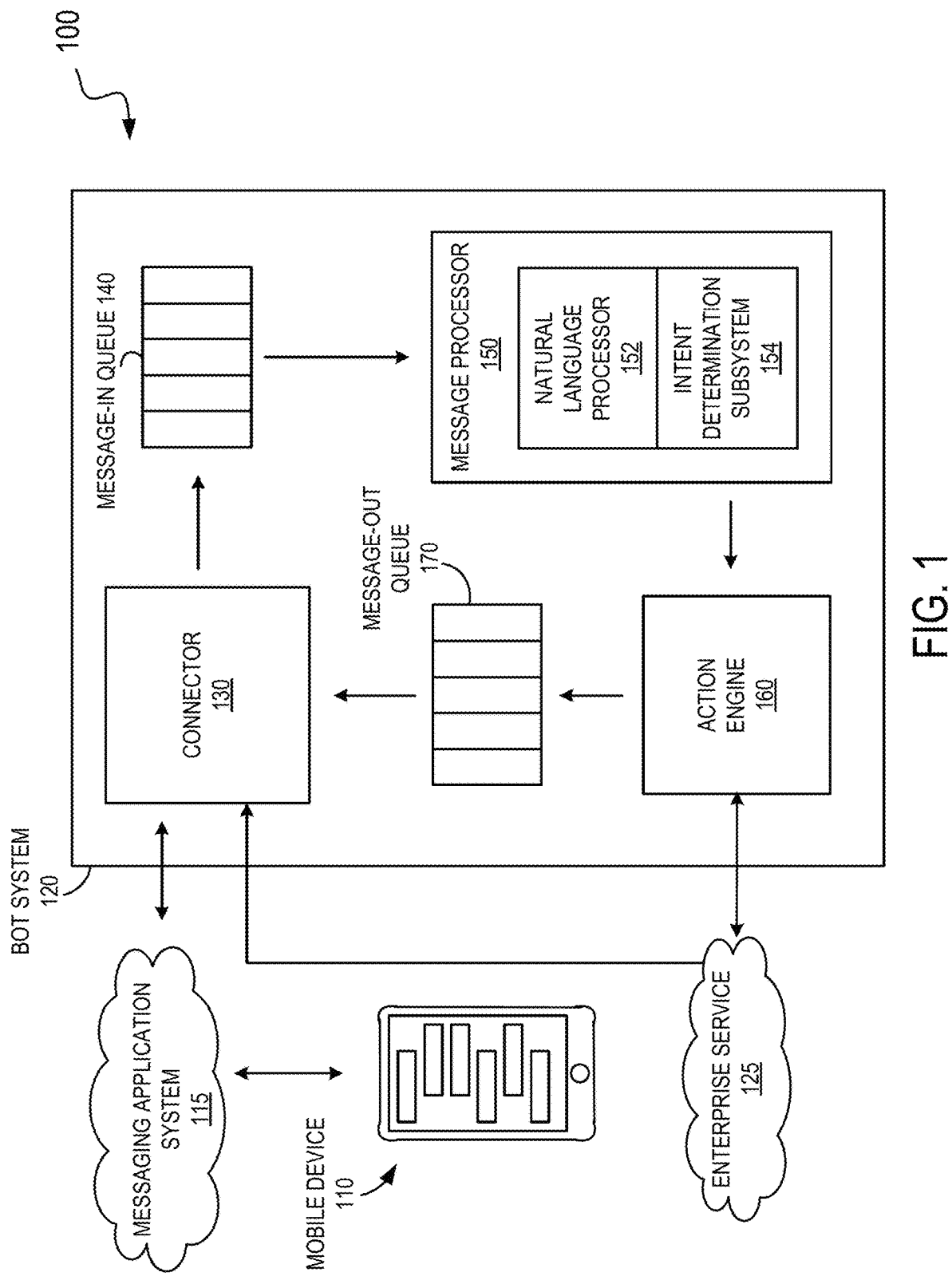
FIG. 1 depicts a distributed system that implements a bot system for communicating with an end user using a messaging application according to certain embodiments.

This disclosure related generally to improving quality of classification models, and more particularly, to improving quality of classification models for differentiating different end user intents by improving the quality of training samples used to train the classification models. According to certain embodiments, pairs of intents that are difficult to differentiate by classification models trained based upon the given training samples (e.g., user utterances) may be identified based upon distinguishability scores. For each of the identified pairs of intents, pairs of training samples each including one training sample associated with one intent and one training sample associated with the other intent in the pair of intents are ranked based upon a similarity score between the two training samples in each pair of training samples. The identified pairs of intents and the pairs of training samples having the highest similarity scores may be presented on a user interface, along with user-selectable options for improving the training samples. The user-selectable options may include adding, deleting, or modifying some training samples, or adding, deleting, or modifying some intents. Various inventive embodiments are described herein, including methods, systems, non-transitory computer-readable storage media storing programs, code, or instructions executable by one or more processors, and the like.

Enterprises may want to create bot systems for various purposes, where the bot systems may include a user intent classification engine that includes one or more classification models for determining end user intents based upon end user utterances, such that the bot systems may respond properly according to the determined end user intents. However, building the user intent classification engine that can determine the end user's intents based upon user utterances is a challenging task in part due to the subtleties and ambiguity of natural languages. The one or more classification models in the user intent classification engine trained using available training samples may not be able to correctly identify certain user intents based upon user utterances, for example, due to the quality of the training samples used to train the classification models, because the quality of a machine learning-based model depends directly on the quality of the training samples. In many cases. it may be difficult to more specifically identify the root causes of the inaccurate classifications and determine how to improve the one or more classification models without a debug or optimization tool.

According to certain embodiments, a computer-implemented technique may determine a distinguishability score for each respective combination of two intents (forming a pair) within a plurality of intents that is defined by a developer of a bot system. The computer-implemented technique may then identify each pair of intents that is difficult to differentiate by a classification model trained using given training samples (e.g., user utterances) based upon the distinguishability score (e.g., F-score), such as based upon the distinguishability score being lower than a threshold. For each pair of intents that is determined to be difficult to differentiate, the computer-implemented technique may further determine a similarity score (e.g., Jaccard similarity score or a Levenshtein distance) between the two training samples in each pair of training samples that includes a training sample associated with a first intent in the pair of intents and a training sample associated with a second intent in the pair of intents, and select pairs of training samples that have the highest similarity scores. The identified one or more pairs of intents and the selected one or more pairs of training samples may then be provided together with some editing options to the developer, for example, through a graphic user interface (GUI), t so that the developer may remove, add, or modify some training samples, and/or add, delete, or modify some intents. In some embodiments, suggestions may be provided to the developer for improving the quality of the training samples and the end user intents defined by the developer, and thus improving the classification models for differentiating different end user intents. The developer may update the training samples and/or end user intents for retraining the classification models. The computer-implemented technique may then perform the above-described processing recursively until no pair of intents may be identified as difficult to differentiate (e.g., when all pairs of intents have distinguishability scores greater than the threshold value).

Techniques disclosed herein can be used to debug and/or optimize classification models used by a bot system to determine end user intents based upon user utterances. For example, the techniques may identify possible root causes of misclassifications by a classification model, such as identifying specific training samples that are associated with different intents but are very similar, or specific intents that may need to be better defined. Thus, a developer may only need to review and edit the identified training samples or intents. In some embodiments, only classification models associated with the updated intents or the updated training samples may be retrained. Thus, the developer can quickly verify the effectiveness of the editing for the optimization using techniques disclosed herein, without having to retrain all intent classification models for the bot system.

As used herein, an "utterance" may refer to any sentence a customer or end user uses to communicate with a bot system. An "intent" may refer to an action that an end user intends to take or intends the bot system to take, or a goal that the end user would like to accomplish, when communicating with the bot system using one or more utterances.

In the following description, for the purposes of explanation, specific details are set forth in order to provide a thorough understanding of examples of the disclosure. However, it will be apparent that various examples may be practiced without these specific details.

The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile application, desktop applications, web applications, enterprise applications, and the like. Further, the teachings of this disclosure are not restricted to a particular operating environment (e.g., operating systems, devices, platforms, and the like) but instead can be applied to multiple different operating environments.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The word "example" or "exemplary" is used herein to mean "serving as an example, instance, or illustration." Any embodiment or design described herein as "exemplary" or "example" is not necessarily to be construed as preferred or advantageous over other embodiments or designs.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some examples, the systems may be configured as a distributed system where one or more components of the system are distributed across one or more networks in a cloud computing system.

Where components are described as being "configured to" perform certain operations, such configuration may be accomplished, for example, by designing electronic circuits or other hardware to perform the operation, by programming or controlling electronic circuits (e.g., microprocessors, or other suitable electronic circuits) to perform the operation, or any combination thereof.

A bot (also referred to as a chatbot, chatterbot, or talkbot) is a computer program that can simulate a conversation with human users. The bot can generally respond to natural-language messages (e.g., questions or comments) through a messaging application that uses natural-language messages. Enterprises may use one or more bot systems to communicate with end users. The messaging application, which may be referred to as a channel, may be user preferred messaging applications that the end users have already installed and familiar with. Thus, the end users do not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, a person of ordinary skill in the art will recognize that the message may be an HTTP post call message, a SMS message, or any other type of communication between two systems.

End users may interact with the bot system through a conversational interaction (sometimes referred to as a conversational user interface (UI)), just as interactions between persons. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may handle user interactions without interaction with an administrator of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a REST call against enterprise services with the proper parameters) and generate a natural language response. The bot system may also prompt the end user for additional input parameters or request other additional information. In some embodiments, the bot system may also initiate communication with the end user.

A conversation with a bot may go through a specific flow including multiple states. The flow may define what would happen next based upon an input. In some embodiments, a state machine that includes user defined states (e.g., end user intents) and actions to take in the states or from state to state may be used to implement the bot. A conversation may take different paths based upon the user input, which may impact the decision the bot makes for the flow. For example, at each state, based upon the user input, the bot may determine the end user's intent in order to determine the appropriate next action to take.

An intent may include a goal that the end user would like to accomplish. An intent maps an end user input to actions that a backend system should perform for the end user. Therefore, based upon the phrases uttered by the end user in natural language, the bot would map the user utterance to a specific use case or job, such as ordering pizza, getting account balance, transferring money, making a purchase, making a return, etc. Human conversations are often non-linear in nature. End users may often branch into different states during a conversation. For example, if an end user wants to transfer funds from account A to a recipient, the end user may start a conversation with the bot system by, for example, asking the bot to pay the recipient for dinner. The bot may respond with, for example, "from which account?". The end user may pick a checking account but may then realize that he or she is not sure about the balance in the account. Thus, the end user may switch context to ask for balance and recent transactions, and so on. In other words, the end user may trigger changes in the flow and states, for example, from transferring money to checking balance, and then to recent transactions. At some time point, the end user may decide to return to the original intent—paying the recipient. Thus, one task of the bot system is to determining user intents from natural language utterances.

A bot may use a natural language processing (NLP) engine and/or a machine learning model (e.g., an intent classifier) to map user utterances to specific intents. For example, a machine learning based NLP engine may learn to understand and categorize the natural language conversation from the end user and to extract necessary information from the conversation to be able to take precise actions, such as performing a transaction or looking up data from a backend system of record.

FIG. 1 depicts a distributed system 100 that may be used to implement a bot system for communicating with an end user using a messaging application according to certain embodiments. System 100 may include a bot system 120, one or more messaging application systems 115, and one or more user devices, such as one or more mobile devices 110.

In some examples, the messaging application may be installed on an electronic device (e.g., a desktop computer, a laptop, mobile device 110, or the like). While the discussion herein will reference a mobile device and a messaging application, a person of ordinary skill in the art will recognize that any electronic device may be used and any messaging platform or messaging application may be used, such as FACEBOOK® Messenger, WHATSAPP® instant messaging software, WECHAT® mobile text and voice messaging communication service, KIK® Messenger, TELEGRAM® Messenger, SKYPE MOBILE® messenger, Short Message Service (SMS), or any other messaging application that provides a platform for end users to communicate. In other examples, the messaging application may be run through a browser (e.g., GOOGLE CHROME® browser, MOZILLA® FIREFOX® browser, and INTERNET EXPLORER browser) that is installed on mobile device 110. In some embodiments, two or more messaging applications may be installed on a user device for communicating through two or more messaging platforms (such as two or more messaging application systems 115).

The messaging application may be facilitated by a messaging platform, such as messaging application system 115. Mobile device 110 may be connected to messaging application system 115 by a first network (e.g., the Internet). Messaging application system 115 may be a messaging platform provided by a third party, such as Facebook, Tencent, Google, Microsoft, etc. Messaging application system 115 may manage content sent and received through the messaging application across multiple mobile devices or other user devices.

A bot system 120 (e.g., implemented on one or more servers) may also be communicatively connected to messaging application system 115 to send and receive massages. The communication between messaging application system 115 and bot system 120 may be through a second network (e.g., the Internet). The first network and the second network may be the same network, or they may be similar or completely different networks. Messaging application system 115 may route content (e.g., a message or information from a message) from mobile device 110 to bot system 120 using the Internet. In some embodiments, the destination of the content (e.g., an identification of bot system 120) may be included in the content as a nominal addressee. In some embodiments, bot system 120 may also be configured to communicate with two or more messaging application systems 115.

As discussed above, the content being exchanged between end users or between an end user and a bot system may include, for example, text, emojis, audio, media (e.g., a picture, a video, a link), or any other method of conveying a message. An example of a message received by bot system 120 from, for example, FACEBOOK® Messenger may include:

```
{
    "channel": {
        "tenant_id": "DemoTenant",
        "client_data": {
            "channel_user_id": "1103645260000000",
            "type": "facebook",
            "chat_id": "1103645260000000"
        },
        "type": "facebook",
        "bot_id": "DemoBot",
        "client_id": "facebook"
    },
```

-continued

```
    "id": "411fc848-350b-47de-89c3-a0ecee314401",
    "text": "May I have a cheese pizza?",
    "type": "text"
}
```

Bot system 120 may receive the content from messaging application system 115 using a connector 130 that acts as an interface between messaging application system 115 and bot system 120. In some embodiments, connector 130 may normalize content from messaging application system 115 such that bot system 120 may analyze content across different messaging application systems. The content normalization processing may include formatting content from each type of messaging application to a common format for processing. In some embodiments, bot system 120 may include one or more connectors for each of the messaging applications (such as FACEBOOK® Messenger, WHATSAPP® instant messaging software, WECHAT® mobile text and voice messaging communication service, KIK® Messenger, TELEGRAM® Messenger, and SKYPE MOBILE® messenger, a Short Message Service (SMS)). In some implementations, connector 130 may route the content to a message-in queue 140. Message-in queue 140 may include a buffer (e.g., a first-in first-out (FIFO) buffer) that stores content in the order received. In some embodiments, each connector 130 may be associated with one or more message-in queues.

Message-in queue 140 may send the content to a message processor 150 when message processor 150 becomes available. In some embodiments, message processor 150 may pull the content from message-in queue 140. Message processor 150 may parse a message and determine an intent of the parsed message as described in detail below. In some embodiments, message processor 150 may include a natural language processor 152 and an intent determination subsystem 154. Natural language processor 152 may parse a message and perform certain semantic analysis, such as identifying a subject, a predicate (e.g., an action), and/or an object. Intent determination subsystem 154 may determine a user intent based upon the parsed message using, for example, one or more machine learning based classification models. As described above, the intent may include a purpose of the message. For example, a purpose of the message may be to order a pizza, order a computer, transfer money, ask a question regarding delivery, etc. In some embodiments, parameters associated with the intent that more specifically define or clarify the action to take, which may be referred to as entities, may also be extracted from the message by natural language processor 152 and/or intent determination subsystem 154.

After the user intent is determined based upon the content by message processor 150, the determined intent (and the parameters associated with the intent) may be sent to an action engine 160. Action engine 160 may be used to determine an action to perform based upon the intent (and the parameters associated with the intent) and the current state (or context) of a state machine as described above. For example, action engine 160 may send certain outbound content to message-out queue 170 as the response and/or may send a command to or retrieve information from some enterprise services, such as enterprise service 125. Message-out queue 170 may send the outbound content to connector 130. Connector 130 may then send the outbound content to a messaging application system indicated by action engine 160, which may be the same as or different from messaging application system 115. Messaging application system 115 may then forward the outbound content to the messaging application on mobile device 110.

Bot system 120 may communicate with one or more enterprise services (e.g., enterprise service 125), one or more storage systems for storing and/or analyzing messages received by bot system 120, or a content system for providing content to bot system 120. Enterprise service 125 may communicate with one or more of connector 130, action engine 160, or any combination thereof. Enterprise service 125 may communicate with connector 130 in a manner similar to messaging application system 115. Enterprise service 125 may send content to connector 130 to be associated with one or more end users. Enterprise service 125 may also send content to connector 130 to cause bot system 120 to perform an action associated with an end user. Action engine 160 may communicate with enterprise service 125 to obtain information from enterprise service 125 and/or to instruct enterprise service 125 to take an action identified by action engine 160.

In some embodiments, bot system 120 may include one or more timers. A timer may cause action engine 160 to send content to an end user using connector 130 and messaging application system 115 after an amount of time has lapsed. In some embodiments, a timer may send content to bot system 120 similar to an end user or enterprise service 125. For example, the timer may send a message to bot system 120 to be analyzed as a message from an end user would be analyzed.

In one specific embodiment, an end user may send a message to bot system 120 using mobile device 110 through messaging application system 115. The message may include a greeting, such as "Hello" or "Hi." The bot system may determine that a new conversation has begun with the end user and start a state machine. In some embodiments, the bot system may identify one or more characteristics of the end user. For example, the bot system may identify a name of the end user using a profile associated with the end user on the messaging application system. Using the one or more characteristics, the bot system may respond to the end user on the messaging application. The response may include a message to the end user that responds to the message received from the end user. For example, the response may include a greeting with the name of the end user, such as "Hi Tom, What can I do for you?". Depending on the enterprise associated with the bot system, the bot system may progress to accomplish a goal of the enterprise. For example, if the bot system is associated with a pizza delivery enterprise, the bot system may send a message to the end user asking if the end user would like to order pizza. The conversation between the bot system and the end user may continue from there, going back and forth, until the bot system has completed the conversation or the end user stops responding to the bot system.

In some embodiments, the bot system may initiate a conversation with an end user. The bot system-initiated conversation may be in response to a previous conversation with the end user. For example, the end user may order a pizza in the previous conversation. The bot system may then initiate a conversation when the pizza is ready. In some embodiments, the bot system may determine the pizza is ready when an indication is received from the enterprise associated with the bot system (e.g., an employee sending a message to the bot system that the pizza is ready). The conversation may include a message sent to the end user indicating that the pizza is ready.

In some embodiments, the bot system may send a message to the end user on a different messaging application than the messaging application that a previous message was received. For example, the bot system may determine to send the message using Short Message Service (SMS) rather than FACEBOOK® Messenger. In such implementations, the bot system may integrate multiple messaging applications.

In some embodiments, the bot system may determine to start a conversation based upon a timer. For example, the bot system may determine to have a one-week-timer for an end user after a pizza is ordered. Expiration of the one-week timer may cause the bot system to start a new conversation with the end user for ordering another pizza. The timer may be configured by the enterprise and implemented by the bot system.

As described above, in some embodiments, action engine 160 may send command to or retrieve information from some enterprise services 125. For example, when bot system 120 (more specifically, message processor 150) determines an intent to check balance, bot system 120 may determine which of several accounts (e.g., checking or savings account) to check the balance for. If the end user inputs "What's my balance in my savings account," bot system 120 may extract "savings" and send a command to a bank server to check the balance, and then send the received balance information to the end user through a message. If the end user initially only uttered "what's the balance in my account?", bot system 120 may send a message to the end user prompting the end user to further specify the specific account, or may retrieve information for all accounts of the end user and send the account information to the end user for the end user to make a selection.

In some embodiments, the bot system may maintain information between conversations. The information may be used later so that the bot system does not need to ask some questions every time a new conversation is started between the end user and the bot system. For example, the bot system may store information regarding a previous order of pizza by the end user. In a new conversation, the bot system may send a message to the end user that asks if the end user wants the same order as last time.

In some embodiments, bot system 120 may store information associated with end users in a cache. The cache may write to a database to save the information after an outbound message is sent to the messaging application system from connector 130. In other embodiments, the cache may write to the data at different times (e.g., after a particular event, after each event, after an amount of time, or any other metric to determine when to write to the database).

Bot system 120 may allow each component to be scaled when slowdowns are identified. For example, if bot system 120 identifies that the number of messages that are arriving at connector 130 exceeds a threshold, an additional one or more connectors may be added to connector 130. In addition, the number of message-in queues, message processors, instances of action engines, and message-out queues may be increased depending on where the slowdown occurs. In such implementations, additional components may be added without having to add other additional components. For example, a connector may be added without having to add an additional instance of the action engine. In some implementations, one or more components, or a portion of a component, of bot system 120 may be run on a virtual machine. By running on a virtual machine, additional virtual machines may be initiated at desired.

In many bot systems, machine learning-based classifiers may be used to classify end user intents based upon end user utterances. The machine learning-based classifiers may need to be trained using training samples that include utterances and corresponding intents. Build one or more classification models that can accurately determine the end users' intents in order to respond properly may be a challenging task in part due to the subtleties and ambiguity of natural languages. For example, a bot system may need to identify the end user's intent from many possible intents based upon the natural language messages received from the end users. It may be challenging to achieve both a high classification accuracy and a good generalization, in particular, when the training sample size is small relative to the dimension of the input space (e.g., all possible user utterances) and the size of the output space (number of classes) is large.

Some systems may use a multiclass classification model, such as a multiclass Support Vector Machine (SVM) model, to distinguish different classes of user intents. Some systems may use multiple SVMs or other classification models to classify user intents. According to certain embodiments, a hierarchical classification model may be used to classify unknown data into a large number of classes. The hierarchical classification model may have a tree structure that includes a plurality of nodes, where each node in the tree structure may be associated with a classification model of any type, such as a linear classifier (e.g., a logistic regression or naive Bayes classifier), a support vector machine (SVM) classifier, a decision tree classifier, a nearest neighbor classifier, or a neural network classifier. The classification model associated with each node may be chosen, trained, and/or updated independently. The hierarchical classification model may classify each input into one of the classes using two or more classification models at two or more layers of the hierarchical classification model. In some embodiments, the tree structure may be a binary tree structure. Each node may be associated with a binary classification model that can classify inputs into two sets of one or more classes.

Figure 2:
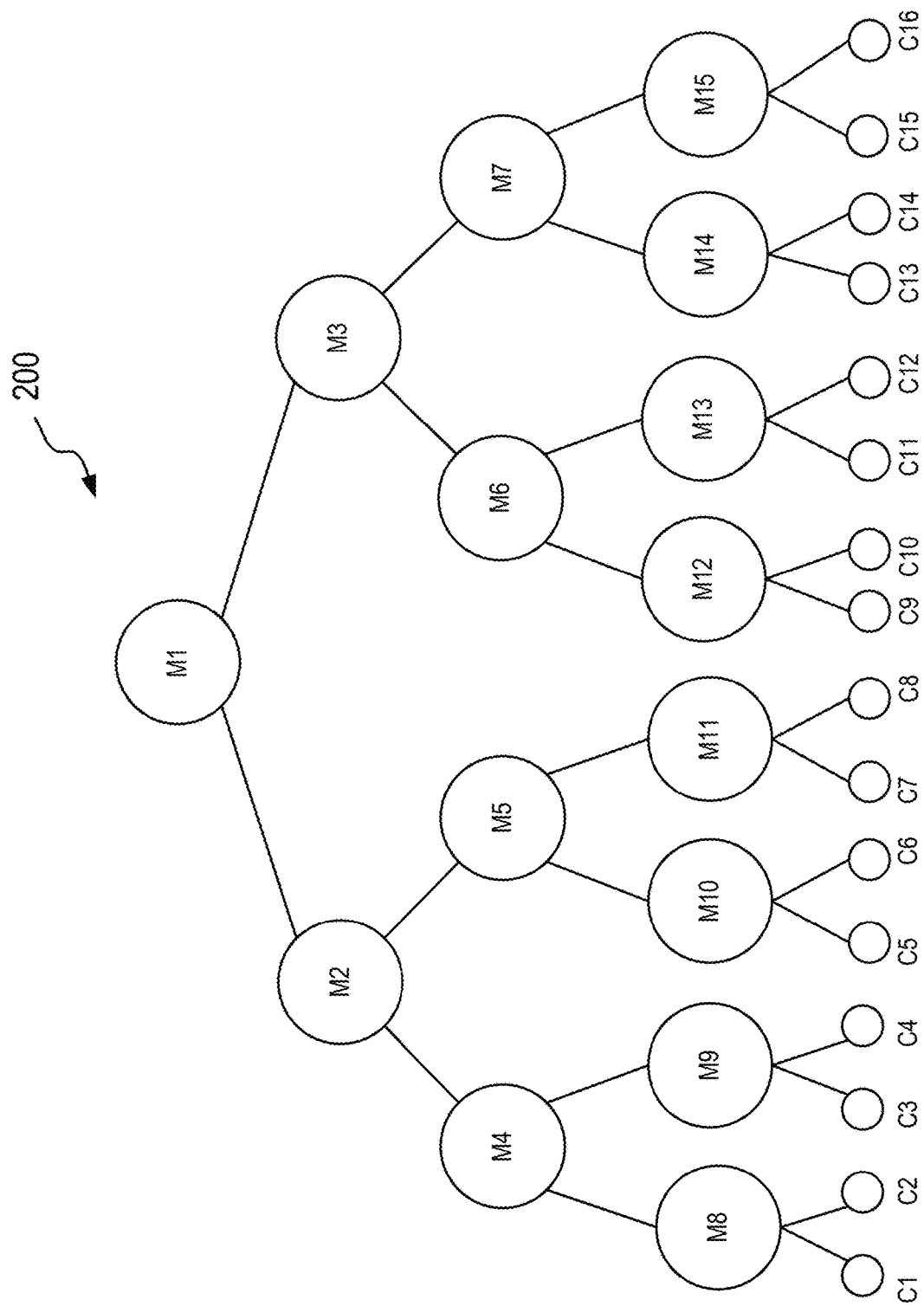
FIG. 2 illustrates an example of a hierarchical classification model including multiple classifiers at nodes of a binary tree structure according to certain embodiment.

FIG. 2 illustrates an example of a hierarchical classification model 200 including multiple classification models at nodes of a binary tree structure according to certain embodiment. In the example, hierarchical classification model 200 may be used to classify any input into one of 16 possible classes C1, C2, . . . , C15, and C16. The tree structure of hierarchical classification model 200 may include 15 nodes on four layers, where 15 classification models (M1, M2, . . . , M14, and M15) may be associated with the 15 nodes respectively. The classification models may be binary classification models.

The first (or top) layer of the tree structure may include one ($2^0$) root node. Classification model M1 associated with the root node may classify any input into one of two groups of classes, where a first group of classes may include, for example, classes C1-C8, and the second group of classes may include, for example, classes C9-C16.

The second layer of the tree structure may include two ($2^1$) nodes, where one node may be associated with classes C1-C8 and the other node may be associated with classes C9-C16. Classification model M2 associated with a node on the second layer may be trained to classify an input into a group of classes including classes C1-C4 and another group of classes including classes C5-C8. Similarly, classification model M3 associated with a node on the second layer may be trained to classify an input into a group of classes including classes C9-C12 and another group of classes including classes C13-C16.

The third layer of the tree structure may include four ($2^2$) nodes, which may be associated with classes C1-C4, C5-C8, C9-C12, and C13-C16, respectively. Classification model M4 associated with a first node on the third layer may be trained to classify an input into a group of classes including classes C1-C2 and another group of classes including classes C3-C4. Classification model M5 associated with a second node on the third layer may be trained to classify an input into a group of classes including classes C5-C6 and another group of classes including classes C7-C8. Other classification models associated with other nodes (e.g., classification models M6 and M7) on the third layer may each be trained to classify an input into a group of classes including two classes and another group of classes including two classes.

The fourth layer of the tree structure may include eight ($2^3$) leaf nodes, where the classification model associated with each leaf node may be a binary classification model trained to classify an input into one of two classes, such as a linear classifier (e.g., a logistic regression or naive Bayes classifier), a support vector machine (SVM) classifier, a decision tree classifier, a nearest neighbor classifier, or a neural network classifier.

In some circumstances, a classification model may not be able to accurately and completely distinguish end user utterances associated with two different end user intents. For example, in some cases, two end user intents may be too close or similar to differentiate. In some cases, the training samples may not be sufficient or may not be correct. For example, two training samples corresponding to two respective end user intents may be too close or too similar. As such, a multi-class classification model or even a binary classification model at any layer of a hierarchical classification model may not be able to correctly classify utterances associated with the two end user intents.

According to certain embodiments, pairs of intents that are difficult to differentiate based upon the given training samples (e.g., user utterances) may be identified from a plurality of intents based upon distinguishability scores (e.g., F-scores). For each of the identified pairs of intents, pairs of training samples each including a training sample associated with one intent and a training sample associated with the other intent are ranked based upon a similarity score (e.g., a Jaccard similarity score or a Levenshtein distance) between the two training samples in each pair. The identified pairs of intents and the corresponding pairs of training samples having the highest similarity scores may be presented to users through a user interface, along with user-selectable options for improving the training samples. The user-selectable options may include adding, deleting, or modifying some training samples, or adding, deleting, or modifying some intents. The updated training samples and end user intents may be used to retrain one or more classification models for differentiating the end user intents that are difficult to differentiate. The above-described processing may be performed recursively until no pair of end user intents may be identified as being difficult to differentiate.

Figure 3:
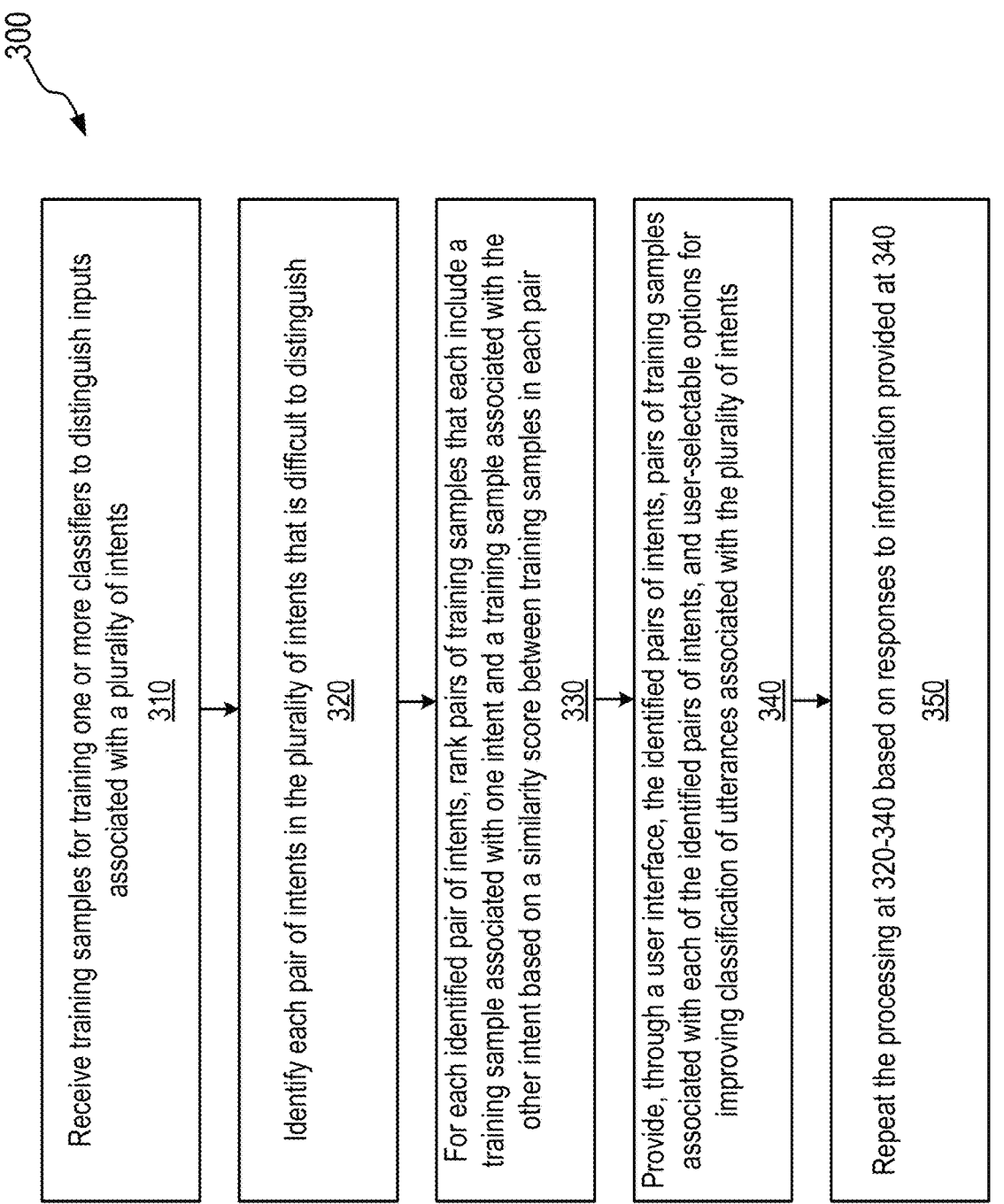
FIG. 3 is a simplified flowchart depicting an example of processing for evaluating and improving utterance quality according to certain embodiments.

FIG. 3 is a simplified flowchart 300 depicting an example of processing for evaluating and improving utterance quality according to certain embodiments. The processing depicted in FIG. 3 may be implemented in software (e.g., code, instructions, or program) executed by one or more processing units (e.g., processors or cores) of the respective systems, hardware, or combinations thereof in a computing system, such as a distributed system, a cloud-based system, or a server. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain embodiments, the steps may be performed in some different orders or some steps may also be performed in parallel.

At 310, a computing system may receive training samples for training one or more classifiers to distinguish inputs associated with a plurality of intents. The plurality of intents may be generated or identified by a developer of a bot system as described above. The training samples may include examples of end user utterances that users may communicate with the bot system. The training samples may also include the end user intents associated with the end user utterances. For example, the training samples may include annotations or labels indicating the end user intents associated with respective end user utterances.

At 320, the computing system may identify from the plurality of intents pairs of intents that are difficult to distinguish based upon the distinguishability scores associated with the pairs of intents. In some embodiments, the pairs of intents may be selected from all possible combinations of two intents within the plurality of intents. In some embodiments, a binary classification model may be trained using a portion (e.g., 80%) of training samples associated with each respective pair of intents in all possible pairs of intents to distinguish utterances associated with the respective pair of intents. The trained classification model may then be used to classify another portion (20%) of the training samples associated with the respective pair of intents. The classification results may be used to determine a test quality score or distinguishability score for the pair of intents. In some embodiments, the test quality score or distinguishability score may include an F-score as described in detail below.

Each pair of intents in the plurality of intents that are difficult to distinguish may then be identified based upon its distinguishability score. For example, pairs of intents with distinguishability scores below a threshold value may be identified as pairs of intents that are difficult to distinguish. In some embodiments, the pairs of intents may be categorized based upon the test quality score or distinguishability score associated with the pairs of intents. For example, one or more threshold values may be used to categorize the pairs of intents into two or more groups. In one example, the pairs of intents may be categorized into three groups based upon the distinguishability scores using two different threshold levels.

At 330, for each pair of intents that is identified as difficult to distinguish, the computing system may rank pairs of training samples that each include a training sample associated with one intent and a training sample with the other intent in the pair of intents based upon a similarity score between the two training samples in each pair of training samples. The pairs of training samples may include any pair of training samples that may include a training sample associated with a first intent in the pair of intents and a training sample associated with a second intent in the pair of intents. In some embodiments, the similarity score may include a Jaccard similarity score (or Jaccard distance) or a Levenshtein distance as described in detail below.

At 340, the computing system may provide, through a graphic user interface (GUI), information that may be used by the developer of the bot system to improve the intent classification. The information may include the identified pairs of intents that are determined to be difficult to distinguish, at least a portion of the corresponding pairs of training samples (e.g., pairs with the highest similarity scores) for each identified pair of intents, and user-selectable options for improving classification of utterances associated with the plurality of intents. In some embodiments, the information may be displayed on one or more GUI screens. For example, some information may be displayed on a new GUI screen when the developer selects a selectable item on a GUI screen, such as a link, a button, a user menu item, and the like. In some embodiments, the user-selectable options may include removing, adding, or modifying some training samples, and/or adding, deleting, or updating some intents. In some embodiments, modifying a training sample may include modifying the utterance associated with the training sample. In some embodiments, modifying a training sample may include modifying the annotation or label of the end user intent associated with the training sample. In some embodiments, adding an intent may include adding training samples associated with the intent. In some embodiments, modifying an intent may include modifying the description of the intent.

At 350, after the developer updates the test samples and/or the intents in response to the information provided at 340, the computing system may repeat the processing at 320-340 to identify intents that are still difficult to differentiate and/or test samples that correspond to different end user intents but are similar. This process may be performed recursively until no pair of intents can be identified as difficult to distinguish.

Figure 4:
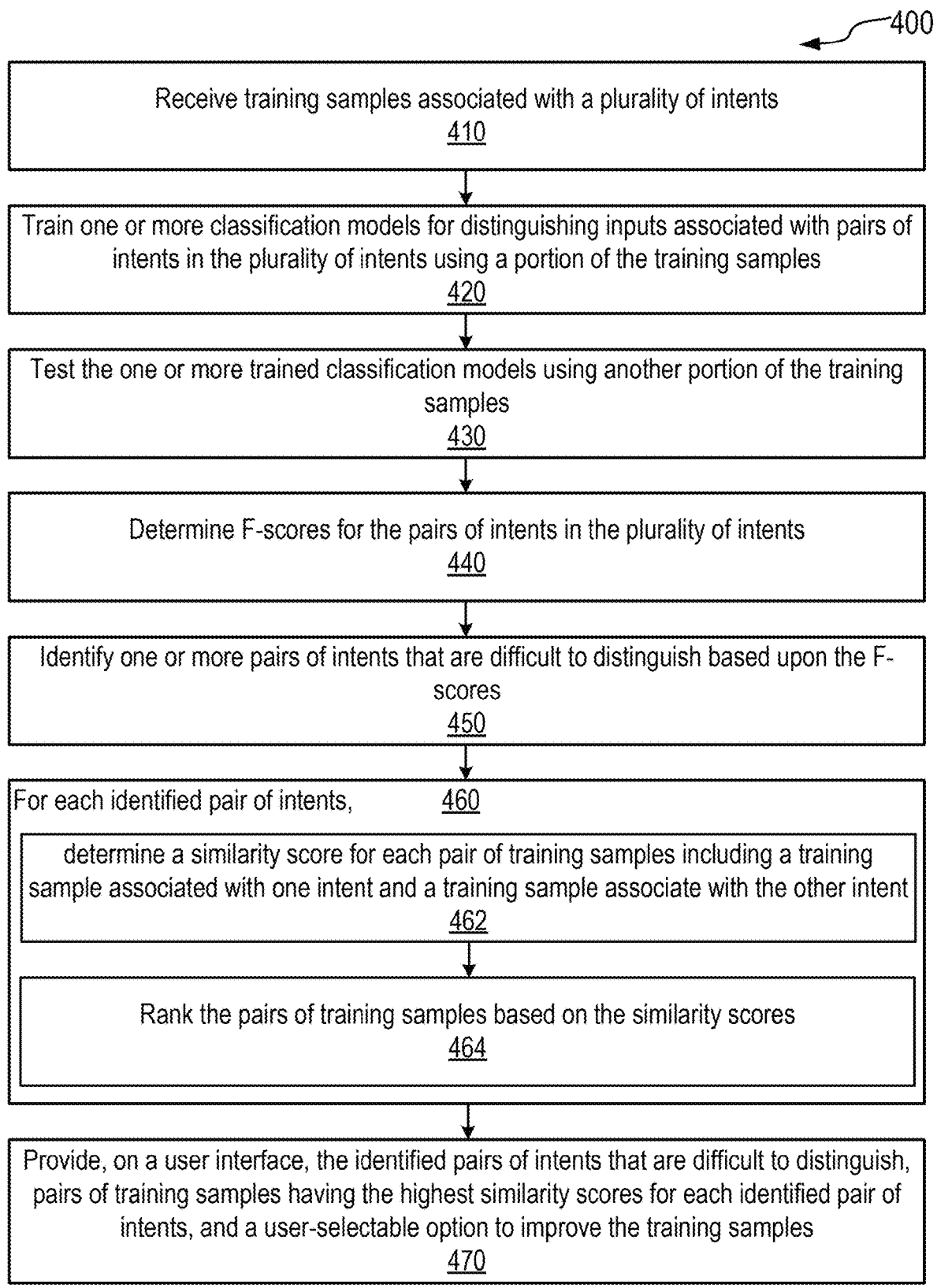
FIG. 4 is a simplified flowchart illustrating an example of processing for determining quality of utterances for training one or more classification models to distinguish user utterances associated with different user intents according to certain embodiments.

FIG. 4 is a simplified flowchart 400 illustrating an example of processing for determining quality of utterances for training one or more classification models to distinguish user utterances associated with different user intents according to certain embodiments. The processing illustrated in FIG. 4 may be a specific example of some processing described with respect to FIG. 3. The processing depicted in FIG. 4 may be implemented in software (e.g., code, instructions, or program) executed by one or more processing units (e.g., processors or cores) of the respective systems, hardware, or combinations thereof in a computing system. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain embodiments, the steps may be performed in some different orders or some steps may also be performed in parallel.

At 410, a computing system may receive training samples for training one or more classifiers to distinguish inputs (e.g., end user utterances) associated with a plurality of intents. The training samples may include sentences (referred to as utterances) that users may use to communicate with a bot system. The plurality of intents may be generated or identified by a developer of a bot system as described above. Each intent may be described by a term or phrase, and may indicate an action that an end user intends to take or intends the bot system to take, or a goal that the end user would like to accomplish. The training samples may include the associated end user intents. For example, the training samples may include annotations or labels indicating the end user intents associated with respective end user utterances.

At 420, the computing system may train one or more classification models for distinguishing inputs associated with pairs of intents within the plurality of intents using a portion of the training samples. For example, pairs of intents that include any combination of two intents in the plurality of intents may be determined. A binary classification model may be trained using training samples associated with each respective pair of intents to differentiate utterances associated with the respective pair of intents. In some embodiments, the training samples associated with each intent may be split into two portions, where one portion (e.g., about 80%) of the training samples may be used for training the classification model, while the other portion (e.g., about 20%) of the training samples (referred to as "test samples") may be used to evaluate the performance of the trained classification model. As described above, the binary classification model may include a linear classifier (e.g., a logistic regression or naive Bayes classifier), a support vector machine (SVM) classifier, a decision tree classifier, a nearest neighbor classifier, or a neural network classifier.

At 430, the computing system may determine the performance of each binary classification model using the test samples. For example, the test samples may be classified by the binary classification model trained at 430. The classification results may indicate that some test samples are associated with a first intent and some test samples are associated with a second intent in the pair of intents. The test samples classified as associated with the first intent may include some test samples that are indeed associated with the first intent (which may be referred to as true positives) and some test samples that are actually associated with the second intent (which may be referred to as false positives). Similarly, the test samples classified as associated with the second intent may include some test samples that are indeed associated with the second intent (which may be referred to as true negatives with respect to the first intent) and some test samples that are actually associated with the first intent (which may be referred to as false negatives with respect to the first intent). Thus, a clean and unambiguous way to present the classification results of a classifier is to use a confusion matrix (also referred to as a contingency table). The confusion matrix may show both the actual class distribution in the test samples and the classifier predicted class distribution with a breakdown of error types. For a binary classification model, the confusion matrix may include a table as shown in Table 1 below. In Table 1, true positives and true negatives are the samples that are correctly classified. It is desirable to minimize the numbers of false positives and false negatives.

TABLE 1

Confusion Matrix

| Actual Class | Predicted Class | |
| --- | --- | --- |
| | First Intent | Second Intent |
| First Intent | True Positives | False Negatives |
| Second Intent | False Positives | True Negatives |

At 440, the computing system may determine an F-score for each pair of intents in the plurality of intents. The F-score may indicate the test quality score of the classification of the test samples, the distinguishability of the pair of intents, or the performance of the trained classifier. The F-score (also referred to as F1 score or F-measure) can be used to measure the performance of the classification models. The F-score is determined based upon both the precision p and the recall r of the classification. For example, the F-score may be a weighted average of the precision p and the recall r of the classification. In one example, the F-score may be the harmonic average of the precision and recall, and may range between 0 (worst precision and recall) and 1 (perfect precision and recall).

As described above, true positives (TP) are samples that are correctly predicted as belonging to a class. True negatives (TN) are samples that are correctly predicted as not belonging to the class. False positives (FP) are samples that are incorrectly predicted as belonging to the class. False negatives (FN) are samples that are incorrectly predicted as not belonging to the class. Accuracy may indicate the ratio of correctly predicted samples to the total samples. Accuracy may be determined using Accuracy=(TP+TN)/(TP+FP+FN+TN). Accuracy may be a good measure when there is an even class distribution (TP+FN≈TN+FP) or when the false positives and false negatives have similar cost. The precision may be determined by dividing the number of true positives using the sum of the numbers of true positives and false positives, i.e., p=TP/(TP+FP). The precision may indicate a classifier's exactness. A low precision may indicate a large number of False Positives. The recall may be determined by dividing the number of true positives using the sum of the numbers of true positives and the number of false negatives (i.e., the number of actually positive samples), i.e., r=TP/(TP+FN). The recall may indicate a classifier's completeness. A low recall may indicate many false negatives. The F-Score is the weighted average of the precision and the recall, and thus takes both false positives and false negatives into consideration. For example, the F-score may be determined using F=2×((p×r)/(p+r)).

At 450, the computing system may identify one or more pairs of intents that are difficult to distinguish based upon the F-scores. For example, pairs of intents with F-scores below a certain value (e.g., 0.75) may be identified as pairs of intents that are difficult to distinguish. In some embodiments, the pairs of intents may be ranked based upon their F-scores. In some embodiments, the pairs of intents may be categorized into two or more groups based upon their F-scores, such as a group of pairs of intents with good distinguishability (e.g., with F-scores greater than 0.75), a group of pairs of intents with average distinguishability (e.g., with F-scores at or above 0.5), and a group of pairs of intents with poor distinguishability (e.g., with F-scores lower than 0.5).

At 460, for each identified pair of intents with poor or average distinguishability, the computing system may identify samples that are similar but are associated different intents. For example, the computing system may determine a similarity score for each pair of training samples that includes a training sample associated with one intent and a training sample associate with the other intent in the pair of intents at 462. In some embodiments, the similarity score may include a Jaccard similarity score or a Levenshtein distance. For example, the Jaccard similarity score may be used to compare the similarity and diversity of samples, and may be defined as the size of the intersection between two data sets divided by the size of the union of the two data sets, i.e.:

$$J(A,B)=|A \cap B|/|A \cup B|.$$

For example, utterance "I want to transfer money" and utterance "I do not want to transfer money" may have a similarity score (e.g., Jaccard similarity score) of 5/7. The Jaccard similarity score may be between 0 and 1. The pairs of training samples may then be ranked based upon the similarity scores at 464. In some embodiments, the pairs of training samples with the highest similarity score may be identified.

At 470, the computing system may provide, on a graphic user interface, the identified pairs of intents that are difficult to distinguish, the pairs of training samples having the highest similarity scores for each identified pair of intents, and one or more user-selectable options to improve the training samples. In some embodiments, such information may be displayed on one or more GUI screens. For example, some information may be displayed when the developer selects a selectable item on a GUI screen, such as a link, a button, a user menu item, and the like. In some embodiments, the user-selectable options may include removing, adding, or modifying some training samples, and/or adding, deleting, or modifying some intents. In some embodiments, modifying a training sample may include modifying the utterance associated with the training sample. In some embodiments, modifying a training sample may include modifying the annotation or label of the end user intent associated with the training sample. In some embodiments, adding an intent may include adding training samples associated with the intent. In some embodiments, modifying an intent may include modifying the description of the intent. A developer of the bot system may then update the training samples and/or the intents in response to the information provided through the GUI.

Figure 5:
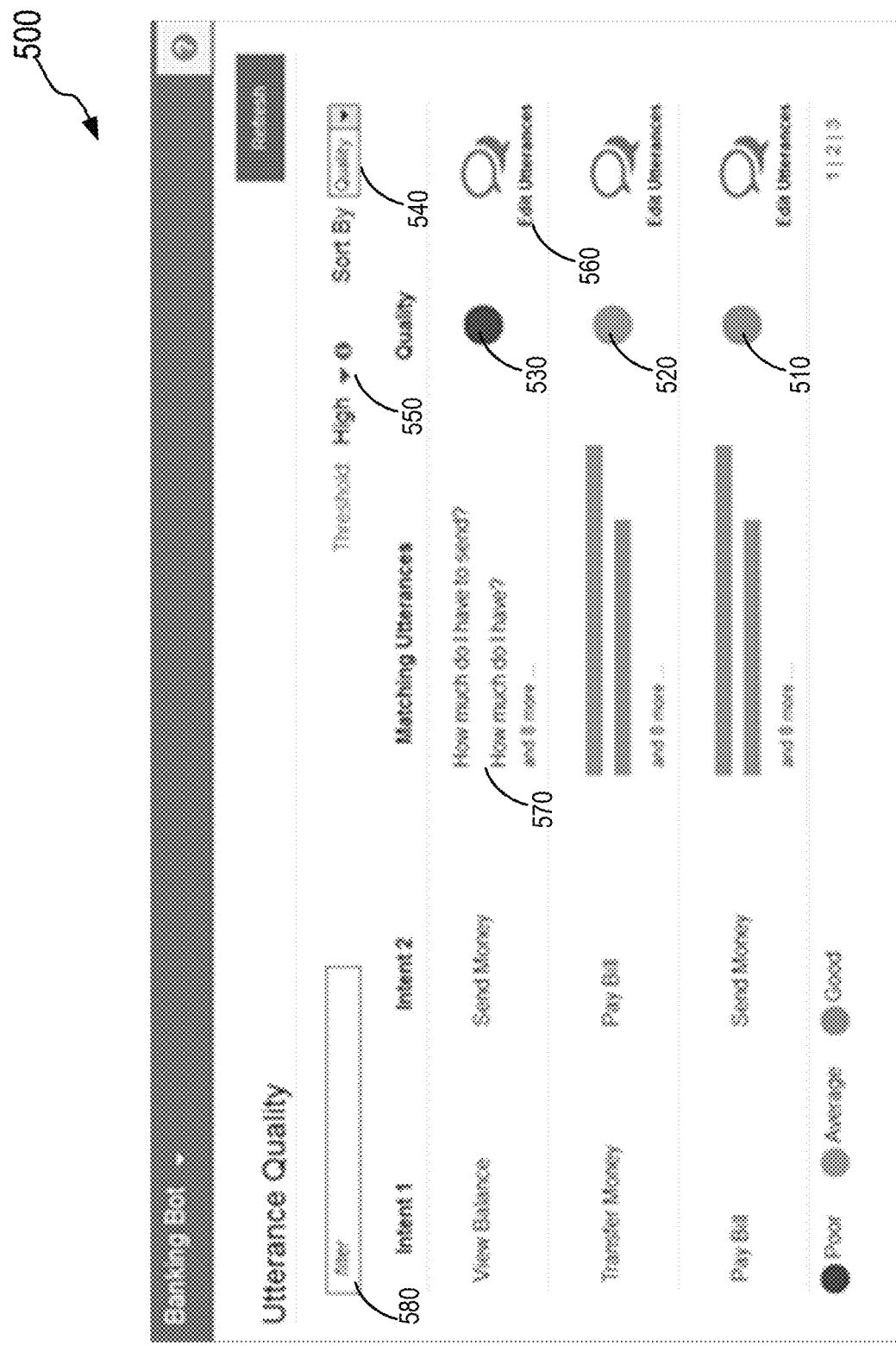
FIG. 5 illustrates an example of a graphical user interface screen showing the distinguishability between intents using intent classification models trained based upon given utterances according to certain embodiments.

FIG. 5 illustrates an example of a graphical user interface (GUI) screen 500 showing the distinguishability between intents using intent classification models trained based upon given utterances used for training according to certain embodiments. GUI screen 500 may help to visualize the distinguishability of pairs of intents using the provided utterances or the quality of the provided utterances for training classification models to resolve end user intents. In some embodiments, the pairs of intents may be sorted based upon different criteria that can be specified using a selectable item 540 (e.g., a pulldown menu). The pairs of intents may also be filtered based upon different criteria that can be specified using a selectable item 580 (e.g., a selectable tab). In the example illustrated in FIG. 5, the distinguishability of pairs of intents may be categorized into three different levels. For example, pairs of intents with good distinguishability (e.g., with F-scores greater than 0.75) may be indicated by an indicator 510 (e.g., a green circle), pairs of intents with medium distinguishability (e.g., with F-scores greater than 0.5) may be indicated by an indicator 520 (e.g., a yellow circle), and pairs of intents with poor distinguishability (e.g., with F-scores at or below 0.5) may be indicated by an indicator 530 (e.g., a red circle). The threshold for each level may be set or adjusted by the developer, for example, using a selectable item 550 (e.g., a pulldown menu). GUI screen 500 may show the two intents in each pair, and may also provide a preview of pairs of utterances (as indicated by 570) that each include an utterance associated with one intent and an utterance associated with the other intent in the corresponding pair of intents. The pairs of utterances may be ranked and displayed based upon the similarity scores for the respective pair of utterances. A developer may edit the utterances and/or the pairs of intents by clicking "Edit Utterances" icons 560.

Figure 6:
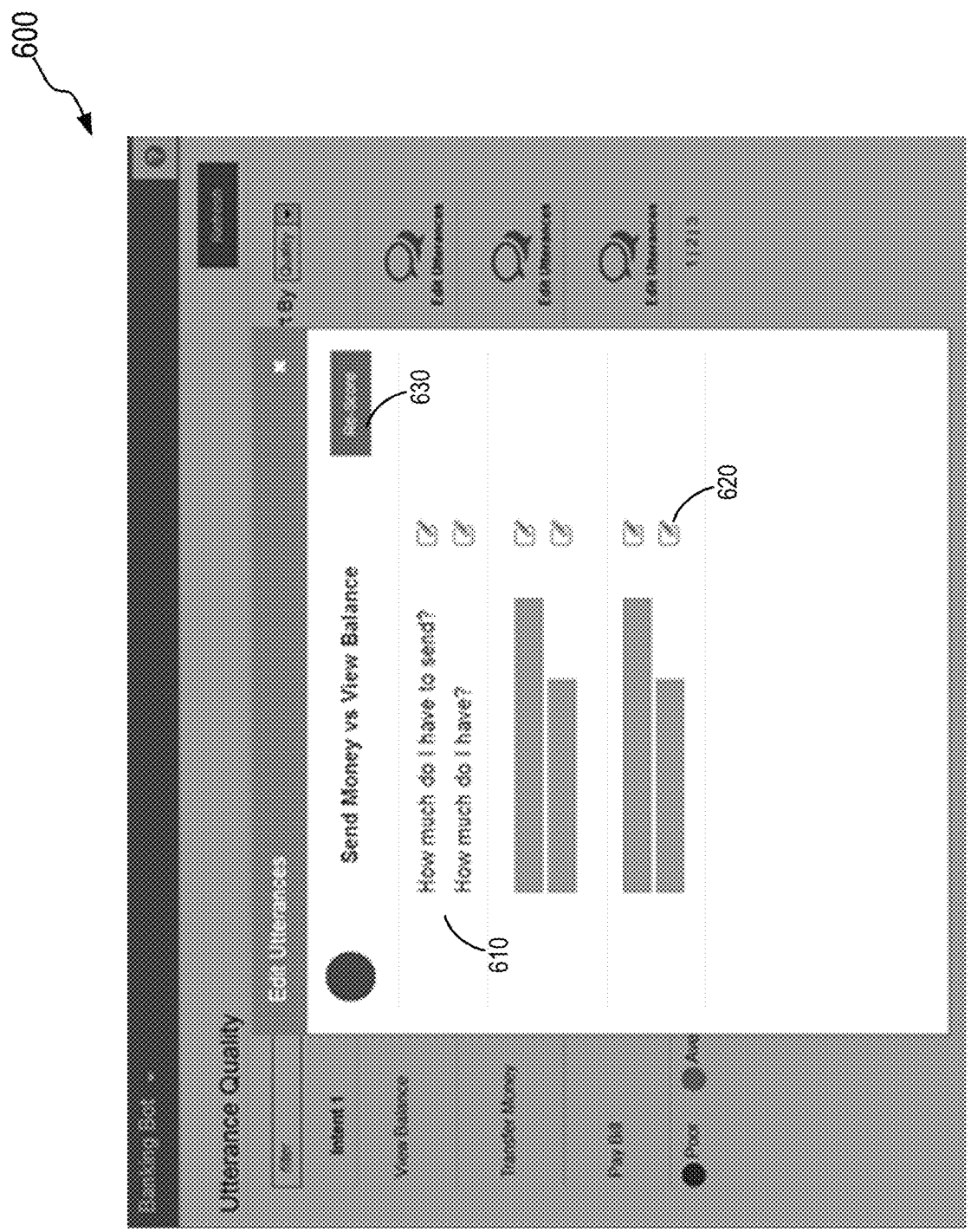
FIG. 6 depicts an example of a graphical user interface screen displaying examples of similar utterances associated with a pair of intents that has a low distinguishability score according to certain embodiments.

FIG. 6 depicts an example of a graphical user interface screen 600 displaying examples of similar utterances associated with a pair of intents that has a low distinguishability score according to certain embodiments. GUI screen 600 may be displayed to a developer when, for example, an "Edit Utterances" icon 560 is clicked. GUI screen 600 may show pairs of utterances 610 ranked based upon the similarity scores (e.g., the Jaccard similarity scores). Each pair of utterances may include one utterance associated with one intent and one utterance associated with another intent. A developer may view some or all pairs of utterances that have high similarity scores. A developer may edit any utterance by clicking on an icon 620. The editing may include deleting, modifying, or adding any utterance or deleting, modifying, or adding any intent. After the editing, the developer may recalculate the similarity score associated with the modified utterances by clicking a button 630.

Figure 7:
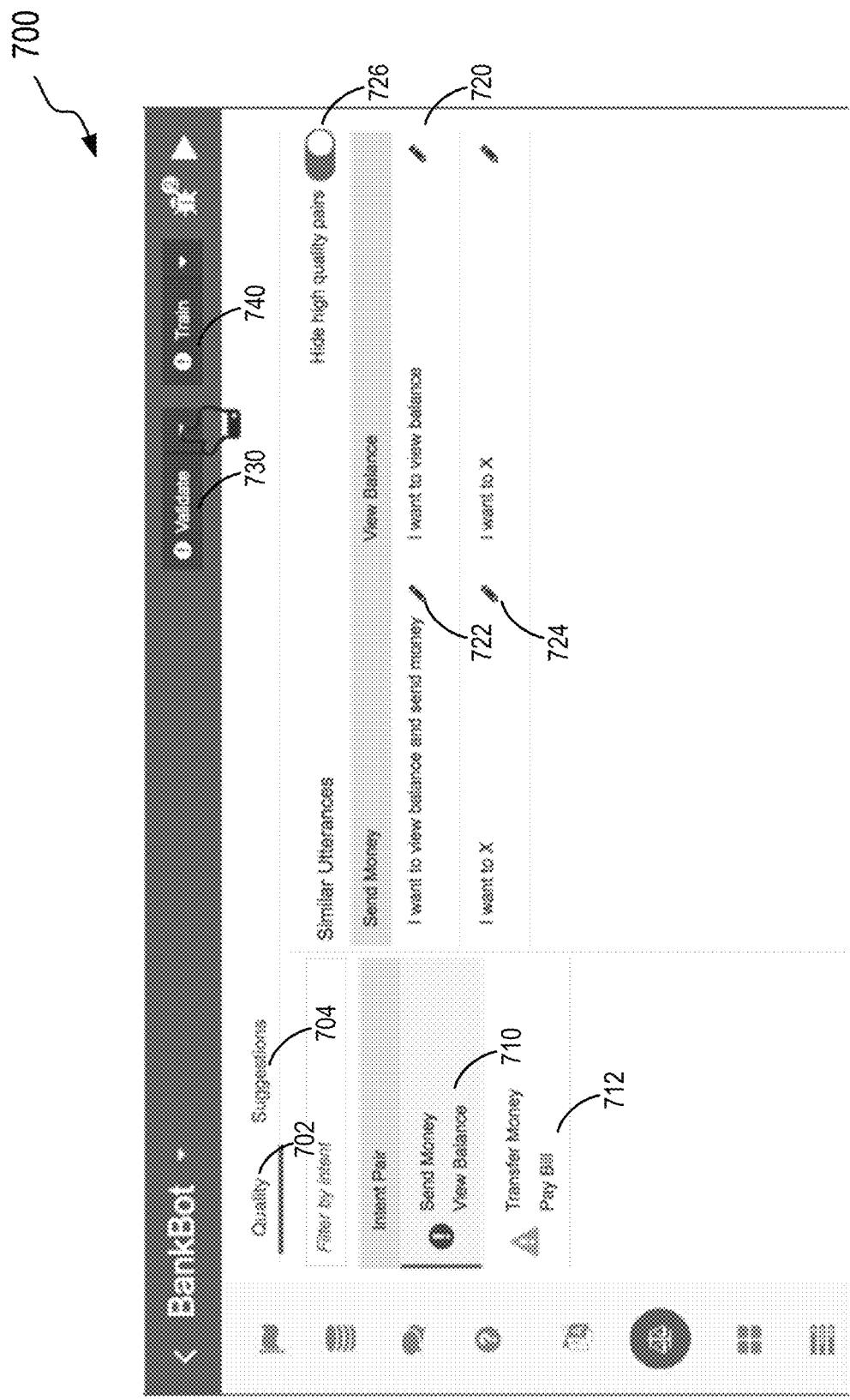
FIG. 7 depicts an example of a graphical user interface screen displaying examples of similar utterances associated with a pair of intents that has a low distinguishability score and options to improve the distinguishability of the pair of intents according to certain embodiments.

FIG. 7 depicts an example of a graphical user interface screen 700 displaying examples of similar utterances associated with a pair of intents that has a low distinguishability score and options to improve the distinguishability of the pair of intents according to certain embodiments. GUI screen 700 may include a "Quality" tab 702 and a "Suggestions" tab 704. When a developer clicks "Quality" tab 702, the quality of the pairs of intents may be displayed. In the example shown in FIG. 7, GUI screen 700 may show a pair of intents 710 that has a poor distinguishability score and a pair of intents 712 that has a medium distinguishability score. When the developer selects pair of intents 710 (e.g., "Send Money" and "View Balance"), a pair of utterances 720 may be shown to the developer. The pair of utterances 720 may include one utterance associated with one intent (e.g., an utterance "I want to view balance and send money" associated with intent "Send Money") and one utterance associated with another intent (e.g., an utterance "I want to view balance" associated with intent "View Balance"). The developer may choose to display or hide high quality (e.g., low similarity) pairs of utterances by toggling a switch 726. The developer may edit (e.g., modify or remove) any utterance by clicking an icon 722. In some embodiments, the developer may also add new utterance by clicking an icon 724. After the editing, the developer may validate the modified utterances by clicking a "Validate" button 730, and/or retrain the classification model for distinguishing the pair of intents by clicking a "Train" button 740.

Figure 8:
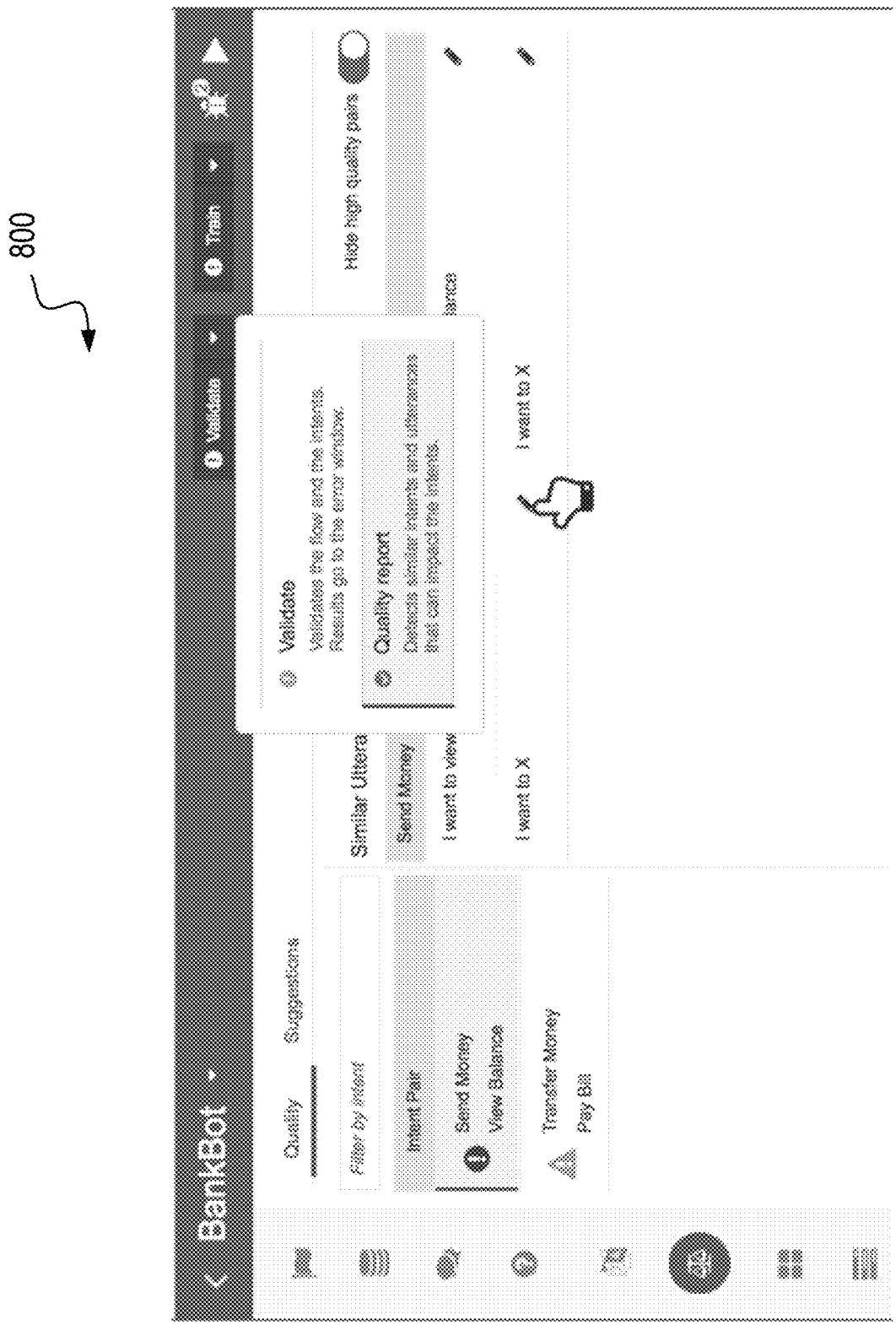
FIG. 8 depicts an example of a graphical user interface screen displaying an option to change between validation and quality report, where the validation may validate the conversation flow and the intents according to certain embodiments.

FIG. 8 depicts an example of a graphical user interface screen 800 displaying options for validation and quality report according to certain embodiments. GUI screen 800 may be displayed after the developer clicks "Validate" button 730. The validation may include validating a flow of a conversation with a bot system and/or one or more intents determined for the conversation. The validation results may be shown in an error window. In some embodiments, the validation may include checking intent quality, checking utterance quality, and checking bot quality. The quality report option may be used to detect similar intents and utterances that can impact the intents.

Figure 9:
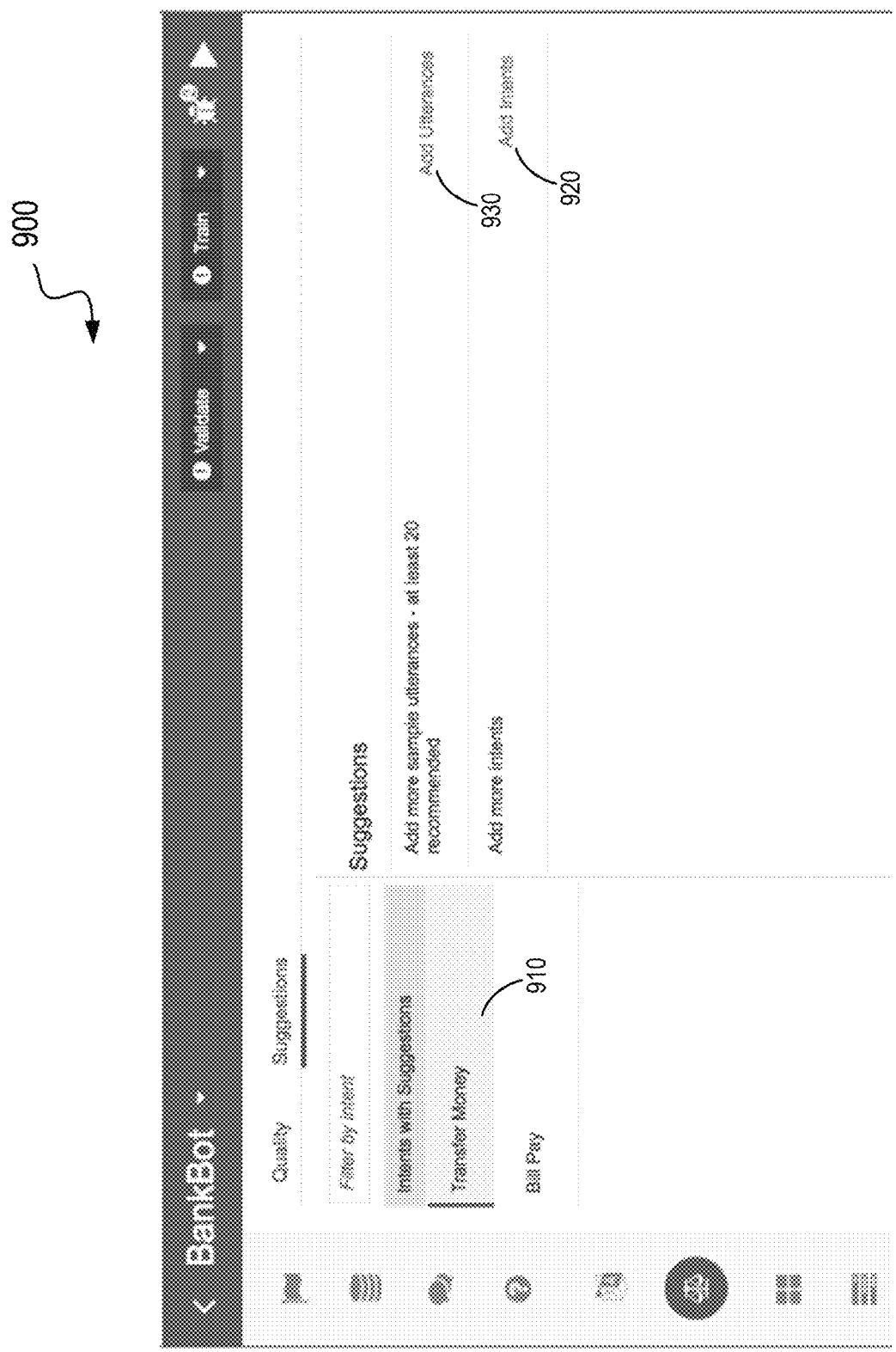
FIG. 9 depicts an example of a graphical user interface screen displaying suggestions for improving the distinguishability of a pair of intents according to certain embodiments.

FIG. 9 depicts an example of a graphical user interface screen 900 displaying suggestions for improving the distinguishability of a pair of intents according to certain embodiments. GUI screen 900 may be displayed when the developer selects a "Suggestions" tab, such as "Suggestions" tab 704 of FIG. 7. The suggestions may be determined based upon, for example, the distinguishability score for each pair of intents and/or the similarity between utterances associated with different intents. In the example shown in FIG. 9, a pair of intents 910 that includes "Transfer Money" and "Bill Pay" is displayed because the pair of intents 910 may have a low distinguishability score. When the developer selects intent "Transfer Money," two example suggestions may be shown. One suggestion may be to add more utterances, which may be performed by selecting an option 930 ("Add Utterances"). Another suggestion may be to add more intents, which may be performed by selecting an option 920 ("Add Intents").

It is noted that FIGS. 5-9 may illustrate some examples of GUI screens. Various different GUI screens may be displayed to the developer to provide information that can be used to improve the quality of the training samples (utterances), intents, and classification models. In addition, the examples of GUI screens shown in FIGS. 5-9 may include other features that are not described above but may be self-explanatory or may be appreciated by one skilled in the art based on the illustration in the figures.

Figure 10:
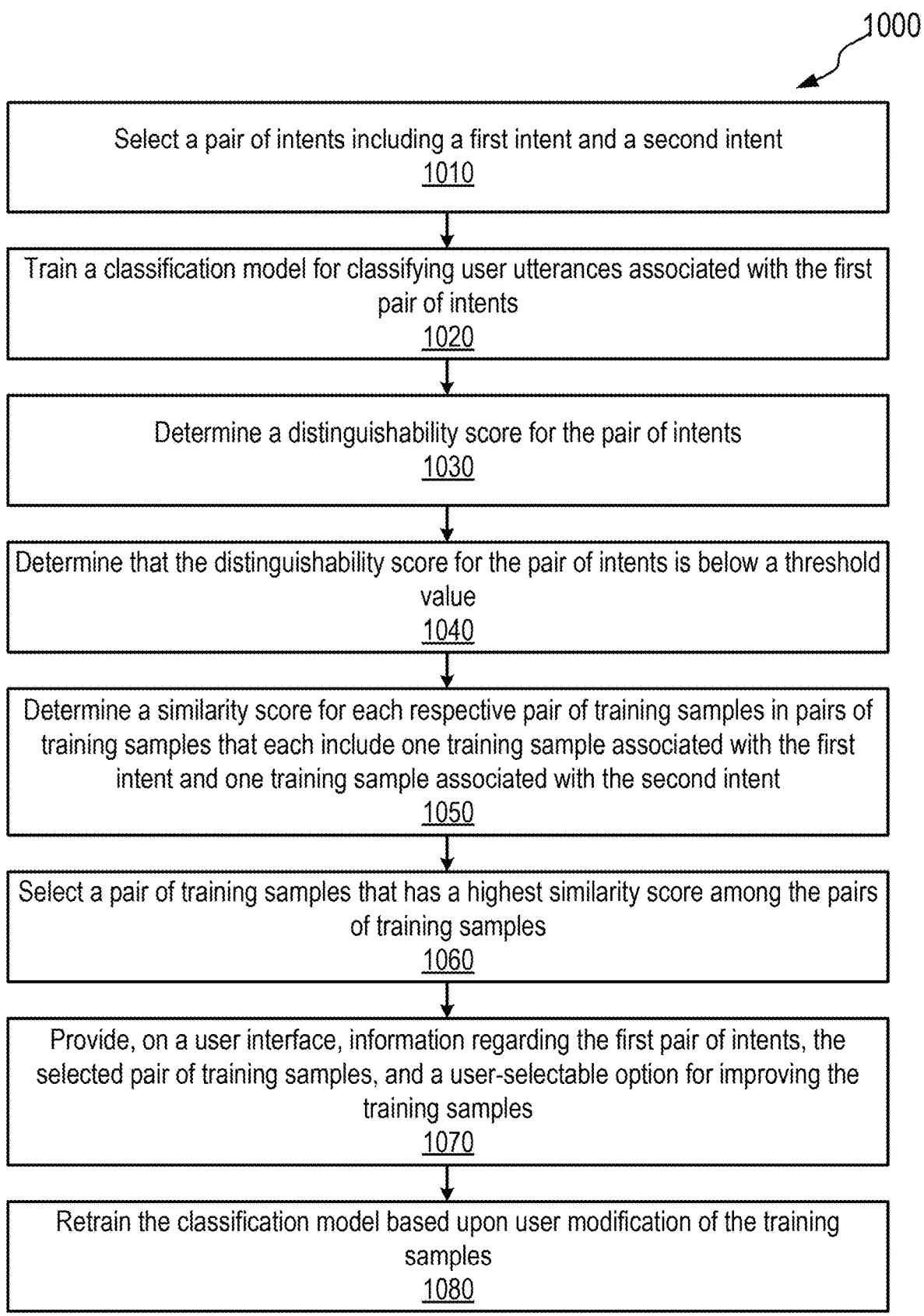
FIG. 10 is a simplified flowchart illustrating an example of processing for determining quality of utterances used to train one or more classification models for distinguishing user utterances associated with different user intents according to certain embodiments.

FIG. 10 is a simplified flowchart 1000 illustrating an example of processing for determining quality of utterances used to train one or more classification models for distinguishing utterances associated with different intents according to certain embodiments. The processing depicted in FIG. 10 may be implemented in software (e.g., code, instructions, or program) executed by one or more processing units (e.g., processors or cores) of the respective systems, hardware, or combinations thereof in a computing system. The software may be stored on a non-transitory storage medium (e.g., on a memory device). The method presented in FIG. 10 and described below is intended to be illustrative and non-limiting. Although FIG. 10 depicts the various processing steps occurring in a particular sequence or order, this is not intended to be limiting. In certain embodiments, the steps may be performed in some different order or some steps may also be performed in parallel.

At 1010, a computing system may select a first pair of intents including a first intent and a second intent from a plurality of intents. The plurality of intents may include possible end user intents when communicating with a bot system. The plurality of intents may be created by a developer of a bot system. The developer may also collect or create training samples that may include end user utterances and the associated intents. The training samples may be used to train one or more classification models for determining end user intents associated with specific utterances by classifying end user utterances into the plurality of intents. A first subset of the training samples may be associated with the first intent and a second subset of the training samples may be associated with the second intent.

At 1020, the computing system may train, based upon the first subset of the training samples and the second subset of the training samples, a classification model for classifying end user utterances associated with the first pair of intents. The classification model may include any binary classification model, such as a support vector machine (SVM) classifier, a logistic regression classifier, a naive Bayes classifier, a decision tree classifier, a nearest neighbor classifier, or a neural network classifier. In some embodiments, training the classification model may include training the classification model using a first portion (e.g., 80%) of the first subset of training samples and a first portion (e.g., 80%) of the second subset of training samples.

At 1030, the computing system may determine a distinguishability score for the first pair of intents, where the distinguishability score may indicate the classification quality of the trained classification model. In some embodiments, the distinguishability score may include an F-score. As described above, to determine the F-score, the trained classification model may be used to classify a second portion (e.g., 20%) of the first subset of training samples and a second portion (e.g., 20%) of the second subset of training samples. The classification results may indicate that some training samples are associated with the first intent and some training samples are associated with the second intent in the pair of intents. The training samples classified as associated with the first intent may include some training samples that are indeed associated with the first intent (which may be referred to as true positives (TPs)) and some training samples that are actually associated with the second intent (which may be referred to as false positives (FPs)). Similarly, the training samples classified as associated with the second intent may include some training samples that are indeed associated with the second intent (which may be referred to as true negatives (TNs) with respect to the first intent) and some training samples that are actually associated with the first intent (which may be referred to as false negatives (FNs) with respect to the first intent). The F-score may be determined using $F=2\times((p\times r)/(p+r))$, where the precision p may be determined by dividing the number of true positives using the sum of the numbers of true positives and false positives, i.e., $p=TP/(TP+FP)$), and the recall r may be determined by dividing the number of true positives using the sum of the number of true positives and the number of false negatives, i.e., $r=TP/(TP+FN)$. The F-score may range from 0 (for worst precision and recall) and 1 (for perfect precision and recall).

At 1040, the computing system may determine that the distinguishability score for the pair of intents is below a threshold value. In one example, the threshold value may be 0.75. Any pair of intents with a distinguishability score below the threshold may be identified as difficult to differentiate.

At 1050, the computing system may determine a similarity score for each respective pair of training samples in pairs of training samples that each include one training sample from the first subset and one training sample from the second subset of training samples. In some embodiments, the similarity score may include a Jaccard similarity score or a Levenshtein Distance as described above. The Jaccard similarity score may be between 0 and 1.

At 1060, the computing system may select one or more pairs of training samples that have the highest similarity scores among the pairs of training samples. In some embodiments, the computing system may select one or more pairs of training samples having similarity scores greater than a certain threshold value.

At 1070, the computing system may provide, through a user interface, information regarding the first pair of intents, the selected pair(s) of training samples, and a user-selectable option for improving the training samples. In some embodiments, providing the information regarding the first pair of intents may include indicating a level of distinguishability of the first pair of intents based upon the distinguishability score for the first pair of intents and one or more threshold values. In some embodiments, the user-selectable option may include deleting or modifying at least one training sample in the selected pair of training samples, adding a new training sample to the first subset or the second subset, deleting or modifying at least one of the first intent or the second intent, or adding a new intent to the plurality of intents, where the new intent may be associated with one training sample in the selected pair of training samples. In some embodiments, modifying a training sample may include modifying the utterance associated with the training sample. In some embodiments, modifying a training sample may include modifying the annotation or label of the end user intent associated with the training sample. In some embodiments, adding an intent may include adding training samples associated with the intent. In some embodiments, modifying an intent may include modifying the description of the intent.

In some embodiments, the computing system may select two or more pairs of intents from the plurality of intents, determine distinguishability scores for the two or more pairs of intents, determine levels of distinguishability of the two or more pairs of intents based upon the distinguishability scores and one or more threshold values, and indicate, through the user interface, the levels of distinguishability of the two or more pairs of intents. In some embodiments, the computing system may select two or more pairs of training samples having highest similarity scores among the pairs of training samples for a pair of intents, and provide information regarding the two or more pairs of training samples and user-selectable options for improving the two or more pairs of training samples.

At 1080, the computing system may receive user modification of the training samples, and perform the processing at 1010-1070 again, until the distinguishability score for any pair of intents in the plurality of intents is greater than the threshold value for the distinguishability score.

Even though some of the embodiments described above relate to classifying end user intents when communicating with a bot system, techniques disclosed herein may be used to improve the quality of training samples and the classification models for any natural language classification.

Figure 11:
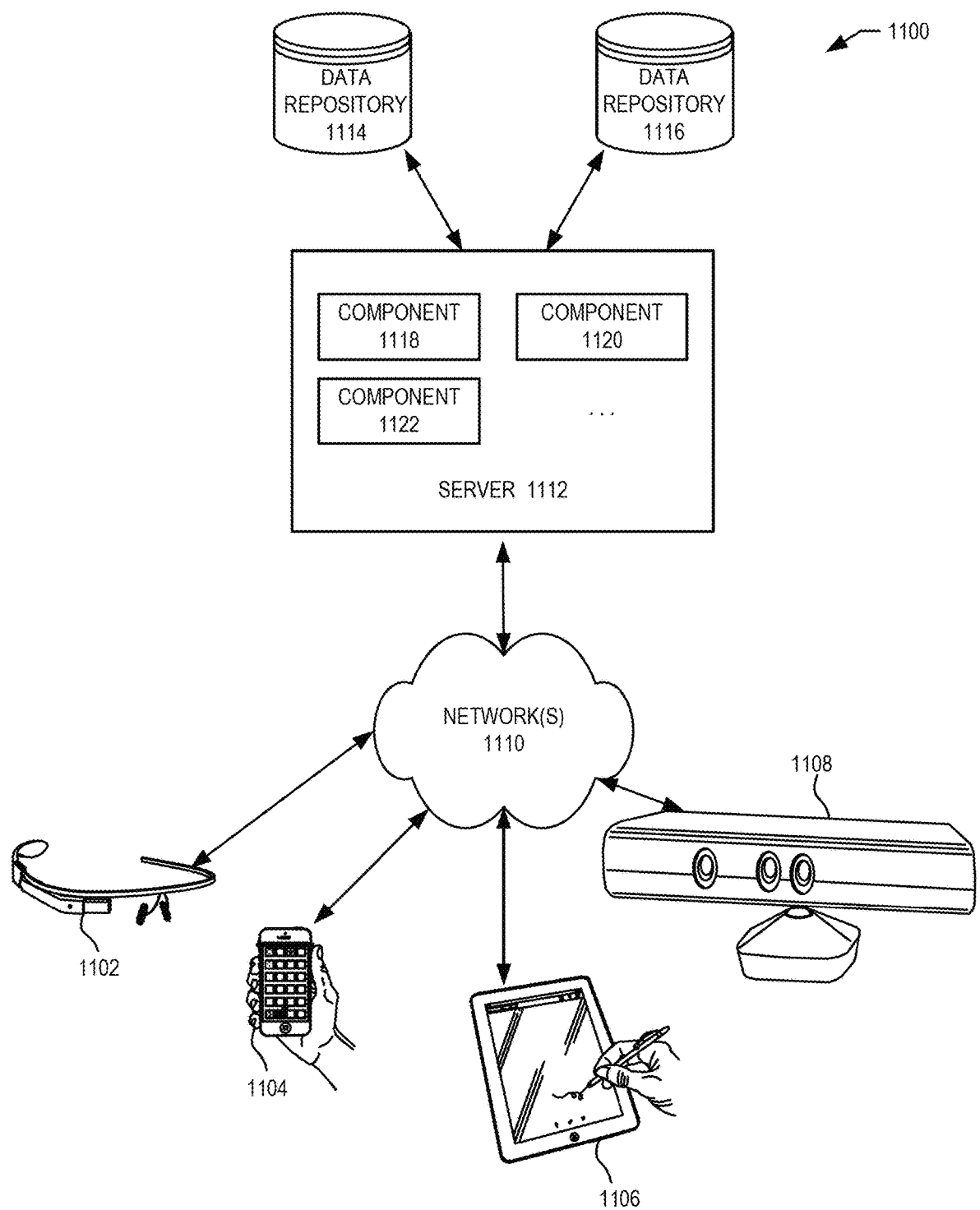
FIG. 11 depicts a simplified diagram of a distributed system for implementing some embodiments.

FIG. 11 depicts a simplified diagram of a distributed system 1100. In the illustrated example, distributed system 1100 includes one or more client computing devices 1102, 1104, 1106, and 1108, coupled to a server 1112 via one or more communication networks 1110. Clients computing devices 1102, 1104, 1106, and 1108 may be configured to execute one or more applications.

In various examples, server 1112 may be adapted to run one or more services or software applications that enable one or more embodiments described in this disclosure. In certain examples, server 1112 may also provide other services or software applications that may include non-virtual and virtual environments. In some examples, these services may be offered as web-based or cloud services, such as under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in FIG. 11, server 1112 may include one or more components 1118, 1120 and 1122 that implement the functions performed by server 1112. These components may include software components that may be executed by one or more processors, hardware components, or combinations thereof. It should be appreciated that various different system configurations are possible, which may be different from distributed system 1100. The example shown in FIG. 11 is thus one example of a distributed system for implementing an example system and is not intended to be limiting.

Users may use client computing devices 1102, 1104, 1106, and/or 1108 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 11 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1110 may be any type of network familiar to those skilled in the art that may support data communications using any of a variety of available protocols, including without limitation TCP/IP (transmission control protocol/ Internet protocol), SNA (systems network architecture), IPX (Internet packet exchange), AppleTalk®, and the like. Merely by way of example, network(s) 1110 may be a local area network (LAN), networks based upon Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1112 may include one or more virtual machines running virtual operating systems, or other computing architectures involving virtualization such as one or more flexible pools of logical storage devices that may be virtualized to maintain virtual storage devices for the server. In various examples, server 1112 may be adapted to run one or more services or software applications that provide the functionality described in the foregoing disclosure.

The computing systems in server 1112 may run one or more operating systems including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more data repositories 1114, 1116. These data repositories may be used to store data and other information in certain examples. For example, one or more of the data repositories 1114, 1116 may be used to store information such as information related to storage virtual machines, information mapping application IDs to application to selected storage virtual machines, and other information used by server 1112 when performing authentication functions. Data repositories 1114, 1116 may reside in a variety of locations. For example, a data repository used by server 1112 may be local to server 1112 or may be remote from server 1112 and in communication with server 1112 via a network-based or dedicated connection. Data repositories 1114, 1116 may be of different types. In certain examples, a data repository used by server 1112 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1114, 1116 may also be used by applications to store application data. The data repositories used by applications may be of different types such as, for example, a key-value store repository, an object store repository, or a general storage repository supported by a file system.

Figure 12:
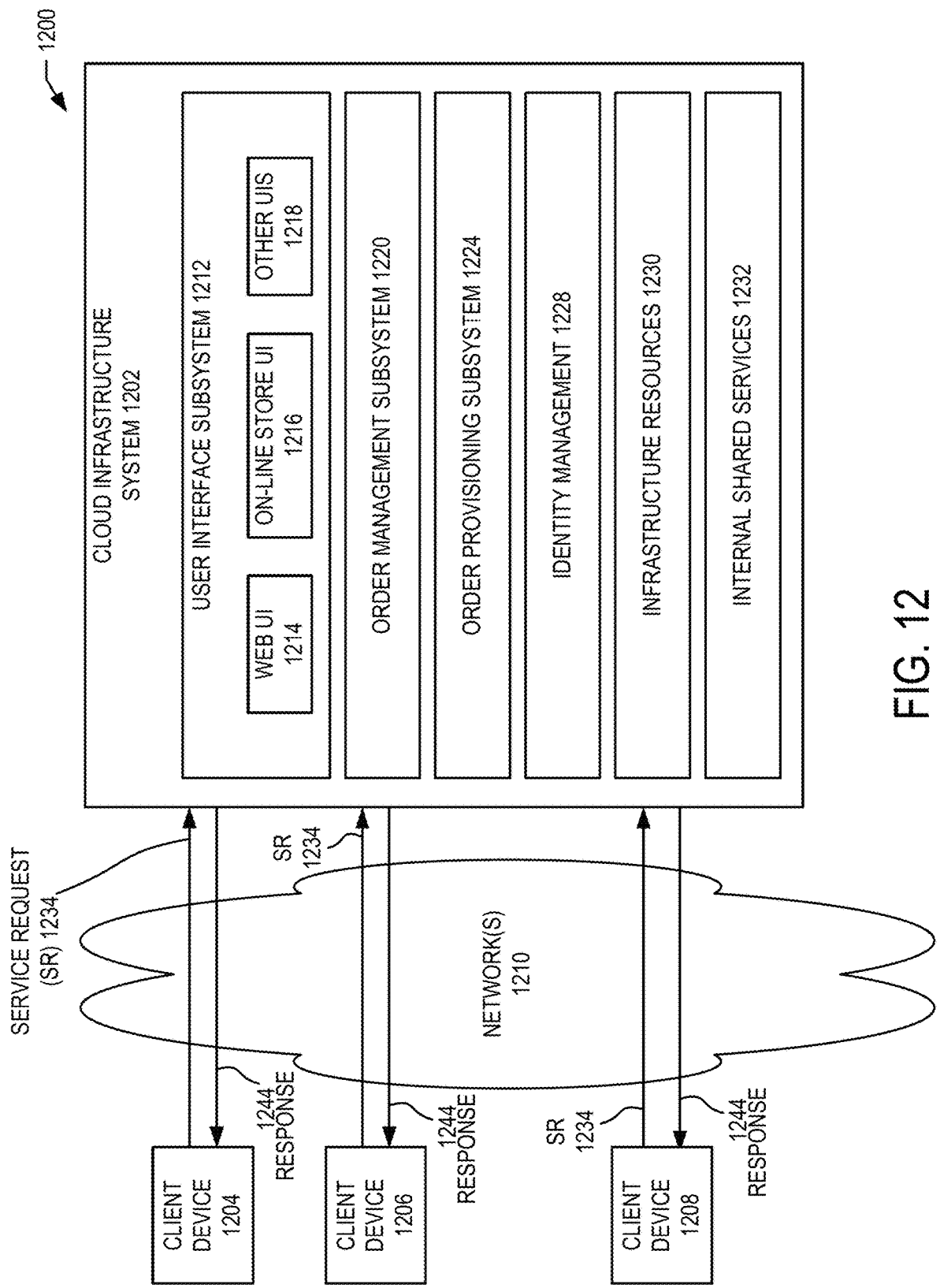
FIG. 12 is a simplified block diagram of a cloud-based system environment for implementing some embodiments.

In certain examples, the functionalities described in this disclosure may be offered as services via a cloud environment. FIG. 12 is a simplified block diagram of a cloud-based system environment in which various services may be offered as cloud services in accordance with certain examples. In the example depicted in FIG. 12, cloud infrastructure system 1202 may provide one or more cloud services that may be requested by users using one or more client computing devices 1204, 1206, and 1208. Cloud infrastructure system 1202 may comprise one or more computers and/or servers that may include those described above for server 1112. The computers in cloud infrastructure system 1202 may be organized as general purpose computers, specialized server computers, server farms, server clusters, or any other appropriate arrangement and/or combination.

Network(s) 1210 may facilitate communication and exchange of data between clients 1204, 1206, and 1208 and cloud infrastructure system 1202. Network(s) 1210 may include one or more networks. The networks may be of the same or different types. Network(s) 1210 may support one or more communication protocols, including wired and/or wireless protocols, for facilitating the communications.

The example depicted in FIG. 12 is only one example of a cloud infrastructure system and is not intended to be limiting. It should be appreciated that, in some other examples, cloud infrastructure system 1202 may have more or fewer components than those depicted in FIG. 12, may combine two or more components, or may have a different configuration or arrangement of components. For example, although FIG. 12 depicts three client computing devices, any number of client computing devices may be supported in alternative examples.

The term cloud service is generally used to refer to a service that is made available to users on demand and via a communication network such as the Internet by systems (e.g., cloud infrastructure system 1202) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain examples, cloud infrastructure system 1202 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1202 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1202. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1202. Cloud infrastructure system 1202 then performs processing to provide the services requested in the customer's subscription order. For example, a user may request the cloud infrastructure system to register an application, as described above, and provide services to the application per the application's specified requirements. Cloud infrastructure system 1202 may be configured to provide one or even multiple cloud services.

Cloud infrastructure system 1202 may provide the cloud services via different deployment models. In a public cloud model, cloud infrastructure system 1202 may be owned by a third party cloud services provider and the cloud services are offered to any general public customer, where the customer may be an individual or an enterprise. In certain other examples, under a private cloud model, cloud infrastructure system 1202 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1202 and the services provided may be shared by several organizations in a related community. Various other models such as hybrids of the above mentioned models may also be used.

Client computing devices 1204, 1206, and 1208 may be of different types (such as client computing devices 1102, 1104, 1106, and 1108 depicted in FIG. 11) and may be capable of operating one or more client applications. A user may use a client device to interact with cloud infrastructure system 1202, such as to request a service provided by cloud infrastructure system 1202. For example, a user may use a client device to request an authentication-related service described in this disclosure.

In some examples, the processing performed by cloud infrastructure system 1202 for providing services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1202 for determining which storage virtual machine is to be selected for a particular application based upon the application's stated authentication-related requirements. The data used for this analysis may include structured data (e.g., data stored in a database or structured according to a structured model) and/or unstructured data (e.g., data blobs (binary large objects)).

As depicted in the example in FIG. 12, cloud infrastructure system 1202 may include infrastructure resources 1230 that are utilized for facilitating the provision of various cloud services offered by cloud infrastructure system 1202. Infrastructure resources 1230 may include, for example, processing resources, storage or memory resources, networking resources, and the like. In certain examples, the storage virtual machines that are available for servicing storage requested from applications may be part of cloud infrastructure system 1202. In other examples, the storage virtual machines may be part of different systems.

In certain examples, to facilitate efficient provisioning of these resources for supporting the various cloud services provided by cloud infrastructure system 1202 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1202 may itself internally use services 1232 that are shared by different components of cloud infrastructure system 1202 and which facilitate the provisioning of services by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1202 may comprise multiple subsystems. These subsystems may be implemented in software, or hardware, or combinations thereof. As depicted in FIG. 12, the subsystems may include a user interface subsystem 1212 that enables users or customers of cloud infrastructure system 1202 to interact with cloud infrastructure system 1202. User interface subsystem 1212 may include various different interfaces such as a web interface 1214, an online store interface 1216 where cloud services provided by cloud infrastructure system 1202 are advertised and are purchasable by a consumer, and other interfaces 1218. For example, a customer may, using a client device, request (service request 1234) one or more services provided by cloud infrastructure system 1202 using one or more of interfaces 1214, 1216, and 1218. For example, a customer may access the online store, browse cloud services offered by cloud infrastructure system 1202, and place a subscription order for one or more services offered by cloud infrastructure system 1202 that the customer wishes to subscribe to. The service request may include information identifying the customer and one or more services that the customer desires to subscribe to. For example, a customer may place a subscription order for a service offered by cloud infrastructure system 1202. As part of the order, the customer may provide information identifying an application for which the service is to be provided and the one or more credentials for the application.

In certain examples, such as the example depicted in FIG. 12, cloud infrastructure system 1202 may comprise an order management subsystem (OMS) 1220 that is configured to process the new order. As part of this processing, OMS 1220 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1220 may then invoke the order provisioning subsystem (OPS) 1224 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1224 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1202 as part of the provisioning process. Cloud infrastructure system 1202 may generate an application ID and select a storage virtual machine for an application from among storage virtual machines provided by cloud infrastructure system 1202 itself or from storage virtual machines provided by other systems other than cloud infrastructure system 1202.

Cloud infrastructure system 1202 may send a response or notification 1244 to the requesting customer to indicate when the requested service is now ready for use. In some instances, information (e.g., a link) may be sent to the customer that enables the customer to start using and availing the benefits of the requested services. In certain examples, for a customer requesting the service, the response may include an application ID generated by cloud infrastructure system 1202 and information identifying a virtual machine selected by cloud infrastructure system 1202 for an application corresponding to the application ID.

Cloud infrastructure system 1202 may provide services to multiple customers. For each customer, cloud infrastructure system 1202 is responsible for managing information related to one or more subscription orders received from the customer, maintaining customer data related to the orders, and providing the requested services to the customer. Cloud infrastructure system 1202 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1202 may provide services to multiple customers in parallel. Cloud infrastructure system 1202 may store information for these customers, including possibly proprietary information. In certain examples, cloud infrastructure system 1202 comprises an identity management subsystem (IMS) 1228 that is configured to manage customer information and provide the separation of the managed information such that information related to one customer is not accessible by another customer. IMS 1228 may be configured to provide various security-related services such as identity services, such as information access management, authentication and authorization services, services for managing customer identities and roles and related capabilities, and the like.

Figure 13:
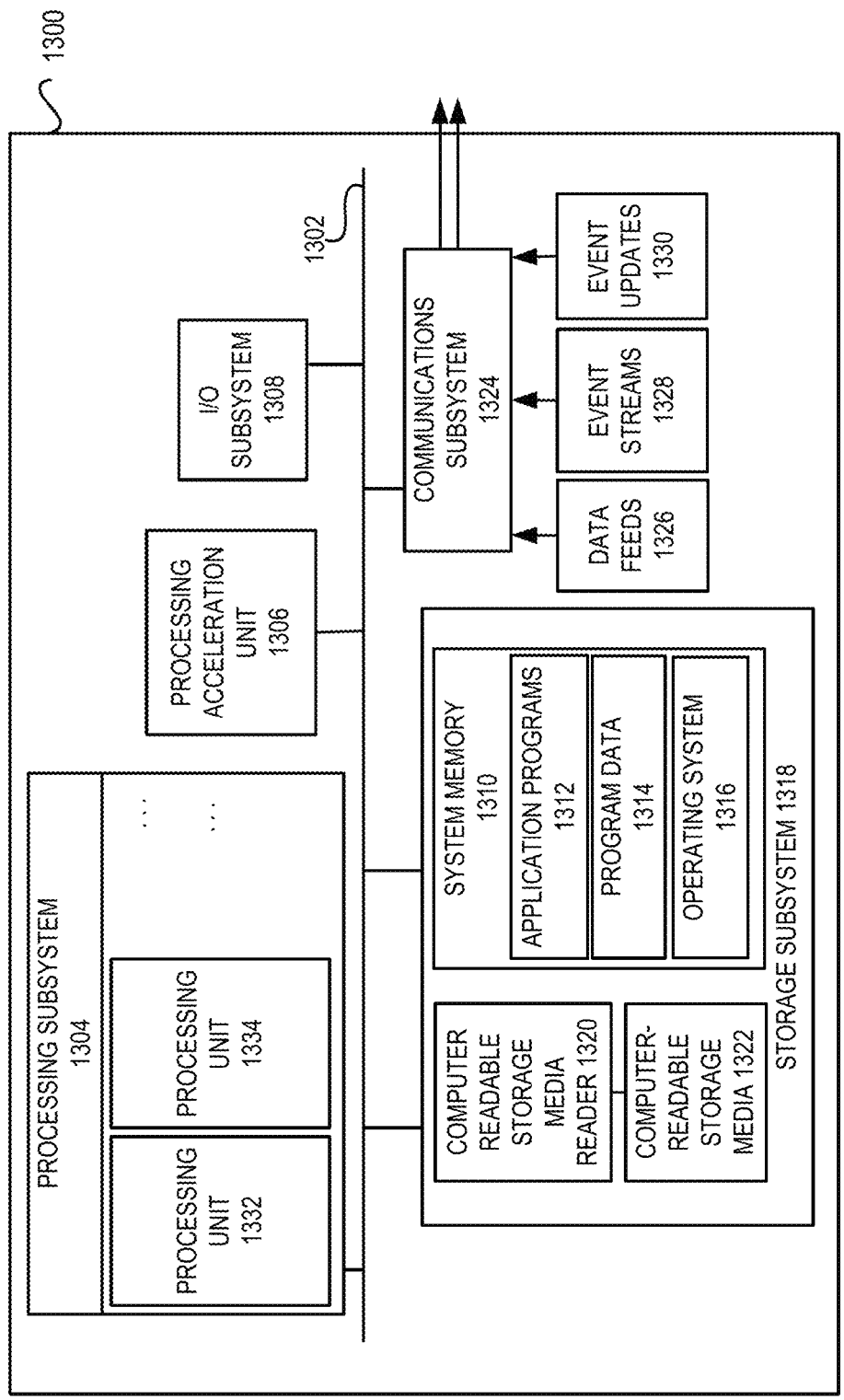
FIG. 13 illustrates an example of a computer system for implementing some embodiments.

FIG. 13 illustrates an example of computer system 1300. In some examples, computer system 1300 may be used to implement any of the application system, access management system, systems within a data center, and various servers and computer systems described above. As shown in FIG. 13, computer system 1300 includes various subsystems including a processing subsystem 1304 that communicates with a number of other subsystems via a bus subsystem 1302. These other subsystems may include a processing acceleration unit 1306, an I/O subsystem 1308, a storage subsystem 1318, and a communications subsystem 1324. Storage subsystem 1318 may include non-transitory computer-readable storage media including storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative examples of the bus subsystem may utilize multiple buses. Bus subsystem 1302 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1304 controls the operation of computer system 1300 and may comprise one or more processors, application specific integrated circuits (ASICs), or field programmable gate arrays (FPGAs). The processors may include be single core or multicore processors. The processing resources of computer system 1300 may be organized into one or more processing units 1332, 1334, etc. A processing unit may include one or more processors, one or more cores from the same or different processors, a combination of cores and processors, or other combinations of cores and processors. In some examples, processing subsystem 1304 may include one or more special purpose co-processors such as graphics processors, digital signal processors (DSPs), or the like. In some examples, some or all of the processing units of processing subsystem 1304 may be implemented using customized circuits, such as application specific integrated circuits (ASICs), or field programmable gate arrays (FPGAs).

In some examples, the processing units in processing subsystem 1304 may execute instructions stored in system memory 1310 or on computer readable storage media 1322. In various examples, the processing units may execute a variety of programs or code instructions and may maintain multiple concurrently executing programs or processes. At any given time, some or all of the program code to be executed may be resident in system memory 1310 and/or on computer-readable storage media 1322 including potentially on one or more storage devices. Through suitable programming, processing subsystem 1304 may provide various functionalities described above. In instances where computer system 1300 is executing one or more virtual machines, one or more processing units may be allocated to each virtual machine.

In certain examples, a processing acceleration unit 1306 may optionally be provided for performing customized processing or for off-loading some of the processing performed by processing subsystem 1304 so as to accelerate the overall processing performed by computer system 1300.

I/O subsystem 1308 may include devices and mechanisms for inputting information to computer system 1300 and/or for outputting information from or via computer system 1300. In general, use of the term input device is intended to include all possible types of devices and mechanisms for inputting information to computer system 1300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1300 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1318 provides a repository or data store for storing information and data that is used by computer system 1300. Storage subsystem 1318 provides a tangible non-transitory computer-readable storage medium for storing the basic programming and data constructs that provide the functionality of some examples. Storage subsystem 1318 may store software (e.g., programs, code modules, instructions) that when executed by processing subsystem 1304 provides the functionality described above. The software may be executed by one or more processing units of processing subsystem 1304. Storage subsystem 1318 may also provide authentication in accordance with the teachings of this disclosure.

Storage subsystem 1318 may include one or more non-transitory memory devices, including volatile and non-volatile memory devices. As shown in FIG. 13, storage subsystem 1318 includes a system memory 1310 and a computer-readable storage media 1322. System memory 1310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1300, such as during start-up, may typically be stored in the ROM. The RAM typically contains data and/or program modules that are presently being operated and executed by processing subsystem 1304. In some implementations, system memory 1310 may include multiple different types of memory, such as static random access memory (SRAM), dynamic random access memory (DRAM), and the like.

By way of example, and not limitation, as depicted in FIG. 13, system memory 1310 may load application programs 1312 that are being executed, which may include various applications such as Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1322 may store programming and data constructs that provide the functionality of some examples. Computer-readable media 1322 may provide storage of computer-readable instructions, data structures, program modules, and other data for computer system 1300. Software (programs, code modules, instructions) that, when executed by processing subsystem 1304 provides the functionality described above, may be stored in storage subsystem 1318. By way of example, computer-readable storage media 1322 may include non-volatile memory such as a hard disk drive, a magnetic disk drive, an optical disk drive such as a CD ROM, DVD, a Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based upon non-volatile memory such as flash-memory based SSDs, enterprise flash drives, solid state ROM, and the like, SSDs based upon volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1318 may also include a computer-readable storage media reader 1320 that may further be connected to computer-readable storage media 1322. Reader 1320 may receive and be configured to read data from a memory device such as a disk, a flash drive, etc.

In certain examples, computer system 1300 may support virtualization technologies, including but not limited to virtualization of processing and memory resources. For example, computer system 1300 may provide support for executing one or more virtual machines. In certain examples, computer system 1300 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1300. Accordingly, multiple operating systems may potentially be run concurrently by computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to establish a communication channel to one or more client devices via the Internet for receiving and sending information from and to the client devices. For example, when computer system 1300 is used to implement bot system 120 depicted in FIG. 1, the communication subsystem may be used to communicate with an application system and also a system executing a storage virtual machine selected for an application.

Communication subsystem 1324 may support both wired and/or wireless communication protocols. In certain examples, communications subsystem 1324 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1324 may provide wired network connectivity (e.g., Ethernet) in addition to or instead of a wireless interface.

Communication subsystem 1324 may receive and transmit data in various forms. In some examples, in addition to other forms, communications subsystem 1324 may receive input communications in the form of structured and/or unstructured data feeds 1326, event streams 1328, event updates 1330, and the like. For example, communications subsystem 1324 may be configured to receive (or send) data feeds 1326 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1324 may be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to communicate data from computer system 1300 to other computer systems or networks. The data may be communicated in various different forms such as structured and/or unstructured data feeds 1326, event streams 1328, event updates 1330, and the like to one or more databases that may be in communication with one or more streaming data source computers coupled to computer system 1300.

Computer system 1300 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1300 depicted in FIG. 13 is intended only as a specific example. Many other configurations having more or fewer components than the system depicted in FIG. 13 are possible. Based upon the disclosure and teachings provided herein, a person of ordinary skill in the art will appreciate other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A method of improving training samples for training an intent classification model to classify end user utterances into a plurality of intents, the method comprising, by a computing system:

selecting, from the plurality of intents, a first pair of intents including a first intent and a second intent, wherein a first subset of the training samples is associated with the first intent and a second subset of the training samples is associated with the second intent;

training, based upon the first subset of the training samples and the second subset of the training samples, a classification model for classifying end user utterances associated with the first pair of intents;

determining a distinguishability score for the first pair of intents, the distinguishability score indicating classification quality of the trained classification model;

determining that the distinguishability score for the first pair of intents is below a threshold value;

determining a similarity score between two training samples in each respective pair of training samples in pairs of training samples that each include one training sample from the first subset of the training samples and one training sample from the second subset of the training samples;

selecting a pair of training samples that has a highest similarity score among the pairs of training samples; and providing, through a user interface:
        information regarding the first pair of intents;
        the selected pair of training samples; and
        a user-selectable option for improving the training samples.

2. The method of claim 1, wherein the distinguishability score includes an F-score.

3. The method of claim 1, wherein the similarity score includes a Jaccard similarity score or a Levenshtein distance.

4. The method of claim 1, wherein the classification model includes a support vector machine (SVM) classifier, a logistic regression classifier, a naive Bayes classifier, a decision tree classifier, a nearest neighbor classifier, or a neural network classifier.

5. The method of claim 1, wherein training the classification model includes training the classification model using a first portion of the first subset of the training samples and a first portion of the second subset of the training samples.

6. The method of claim 5, wherein determining the distinguishability score for the first pair of intents includes:

classifying, using the trained classification model, a second portion of the first subset of the training samples and a second portion of the second subset of the training samples; and determining an F-score based upon results of the classifying.

7. The method of claim 1, wherein the user-selectable option includes:

deleting or modifying at least one training sample in the selected pair of training samples;

adding a new training sample to the first subset of the training samples or the second subset of the training samples;

deleting or modifying at least one of the first intent or the second intent; or adding a new intent to the plurality of intents, the new intent associated with one training sample in the selected pair of training samples.

8. The method of claim 1, wherein providing the information regarding the first pair of intents includes indicating a level of distinguishability of the first pair of intents based upon the distinguishability score for the first pair of intents and one or more threshold values.

9. The method of claim 1, further comprising:

selecting two or more pairs of intents from the plurality of intents;

determining distinguishability scores for the two or more pairs of intents;

determining levels of distinguishability of the two or more pairs of intents based upon the distinguishability scores and one or more threshold values; and indicating, through the user interface, the levels of distinguishability of the two or more pairs of intents.

10. The method of claim 1, further comprising:
selecting two or more pairs of training samples having highest similarity scores among the pairs of training samples; and
providing information regarding the two or more pairs of training samples and user-selectable options for improving the two or more pairs of training samples.

11. The method of claim 1, further comprising:
receiving modification to the first subset of the training samples or the second subset of the training samples;
retraining, based upon the first subset of the training samples and the second subset of the training samples, a new classification model for classifying end user utterances associated with the first pair of intents;
determining a new distinguishability score for the first pair of intents; and
indicating, through the user interface, that the first pair of intents can be differentiated by the new classification model based upon determining that the new distinguishability score is above the threshold value.

12. The method of claim 1, wherein the information regarding the first pair of intents includes information indicating the distinguishability score or a level of distinguishability of the first pair of intents.

13. A system comprising:
one or more processors; and
a memory coupled to the one or more processors, the memory storing instructions, which, when executed by the one or more processors, cause the one or more processors to:
select, from a plurality of intents, a first pair of intents including a first intent and a second intent, wherein a first subset of training samples is associated with the first intent and a second subset of training samples is associated with the second intent;
train, based upon the first subset of training samples and the second subset of training samples, a classification model for classifying end user utterances associated with the first pair of intents;
determine a distinguishability score for the first pair of intents, the distinguishability score indicating classification quality of the trained classification model;
determine that the distinguishability score for the first pair of intents is below a threshold value;
determine a similarity score between two training samples in each respective pair of training samples in pairs of training samples that each include one training sample from the first subset of training samples and one training sample from the second subset of training samples;
select a pair of training samples that has a highest similarity score among the pairs of training samples; and
provide, through a user interface:
information regarding the first pair of intents;
the selected pair of training samples; and
a user-selectable option for improving the first subset of training samples or the second subset of training samples.

14. A non-transitory computer readable medium storing a plurality of instructions executable by one or more processors, wherein the plurality of instructions, when executed by the one or more processors, causes the one or more processors to perform processing comprising:
selecting, from a plurality of intents, a first pair of intents including a first intent and a second intent, wherein a first subset of training samples is associated with the first intent and a second subset of training samples is associated with the second intent;
training, based upon the first subset of training samples and the second subset of training samples, a classification model for classifying end user utterances associated with the first pair of intents;
determining a distinguishability score for the first pair of intents, the distinguishability score indicating classification quality of the trained classification model;
determining that the distinguishability score for the first pair of intents is below a threshold value;
determining a similarity score between two training samples in each respective pair of training samples in pairs of training samples that each include one training sample from the first subset of training samples and one training sample from the second subset of training samples;
selecting a pair of training samples that has a highest similarity score among the pairs of training samples; and
providing, through a user interface:
information regarding the first pair of intents;
the selected pair of training samples; and
a user-selectable option for improving the first subset of training samples or the second subset of training samples.

15. The non-transitory computer readable medium of claim 14, wherein training the classification model includes training the classification model using a first portion of the first subset of training samples and a first portion of the second subset of training samples.

16. The non-transitory computer readable medium of claim 15, wherein determining the distinguishability score for the first pair of intents includes:
classifying, using the trained classification model, a second portion of the first subset of training samples and a second portion of the second subset of training samples; and
determining an F-score based upon results of the classifying.

17. The non-transitory computer readable medium of claim 14, wherein the user-selectable option includes:
deleting or modifying at least one training sample in the selected pair of training samples;
adding a new training sample to the first subset of training samples or the second subset of training samples;
deleting or modifying at least one of the first intent or the second intent; or
adding a new intent to the plurality of intents, the new intent associated with one training sample in the selected pair of training samples.

18. The non-transitory computer readable medium of claim 14, wherein providing the information regarding the first pair of intents includes indicating a level of distinguishability of the first pair of intents based upon the distinguishability score for the first pair of intents and one or more threshold values.

19. The non-transitory computer readable medium of claim 14, wherein the plurality of instructions further causes the one or more processors to perform processing comprising:
receiving modification to the first subset of training samples or the second subset of training samples;
retraining, based upon the first subset of training samples and the second subset of training samples, a new classification model for classifying end user utterances associated with the first pair of intents;

determining a new distinguishability score for the first pair of intents; and indicating, through the user interface, that the first pair of intents can be differentiated by the new classification model based upon determining that the new distinguishability score is above the threshold value.

20. The non-transitory computer readable medium of claim 14, wherein the distinguishability score includes an F-score.

21. The non-transitory computer readable medium of claim 14, wherein the similarity score includes a Jaccard similarity score or a Levenshtein distance.

* * * * *